United States Patent
Herlihy

(10) Patent No.: US 11,021,620 B2
(45) Date of Patent: Jun. 1, 2021

(54) DIGITAL PRINTING INKS

(71) Applicant: SUN CHEMICAL CORPORATION, Parsippany, NJ (US)

(72) Inventor: Shaun Herlihy, Chatham (GB)

(73) Assignee: Sun Chemical Corporation, Parsippany, NJ (US)

( * ) Notice: Subject to any disclaimer, the term of this patent is extended or adjusted under 35 U.S.C. 154(b) by 158 days.

(21) Appl. No.: 15/119,484

(22) PCT Filed: Feb. 27, 2015

(86) PCT No.: PCT/US2015/017952
§ 371 (c)(1),
(2) Date: Aug. 17, 2016

(87) PCT Pub. No.: WO2015/131027
PCT Pub. Date: Sep. 3, 2015

(65) Prior Publication Data
US 2017/0009091 A1 Jan. 12, 2017

Related U.S. Application Data

(60) Provisional application No. 61/945,956, filed on Feb. 28, 2014, provisional application No. 61/977,787, filed on Apr. 10, 2014.

(51) Int. Cl.
| | | |
|---|---|---|
| *C09D 11/107* | (2014.01) | |
| *C09D 11/322* | (2014.01) | |
| *C08F 2/50* | (2006.01) | |
| *C09D 11/36* | (2014.01) | |
| *C09D 11/30* | (2014.01) | |
| *C09D 11/38* | (2014.01) | |
| *C09D 11/101* | (2014.01) | |
| *C09D 11/103* | (2014.01) | |
| *C09D 11/104* | (2014.01) | |

(52) U.S. Cl.
CPC ............. *C09D 11/107* (2013.01); *C08F 2/50* (2013.01); *C09D 11/101* (2013.01); *C09D 11/103* (2013.01); *C09D 11/104* (2013.01); *C09D 11/30* (2013.01); *C09D 11/322* (2013.01); *C09D 11/36* (2013.01); *C09D 11/38* (2013.01)

(58) Field of Classification Search
CPC ..... C09D 11/30; C09D 11/101; C09D 11/322; C09D 11/326
See application file for complete search history.

(56) References Cited

U.S. PATENT DOCUMENTS

| | | | |
|---|---|---|---|
| 6,136,890 A * | 10/2000 | Carlson | C09D 11/326 523/160 |
| 6,359,025 B1 | 3/2002 | Snowwhite | |
| 8,722,762 B2 * | 5/2014 | Peleshanko | C08G 18/6659 523/160 |
| 2004/0085418 A1 | 5/2004 | Yau et al. | |
| 2006/0148924 A1 | 7/2006 | Lachowicz et al. | |
| 2008/0076846 A1 | 3/2008 | Kito | |
| 2008/0184930 A1 | 8/2008 | Furukawa | |
| 2009/0087626 A1 | 4/2009 | Hayata et al. | |
| 2011/0168053 A1 | 7/2011 | Peng et al. | |
| 2012/0270018 A1 | 10/2012 | Mizutani et al. | |
| 2014/0011941 A1 | 1/2014 | Anton et al. | |
| 2014/0035995 A1 * | 2/2014 | Chou | C09D 11/101 347/20 |

FOREIGN PATENT DOCUMENTS

JP  2010 229183  10/2010

OTHER PUBLICATIONS

Notification Concerning Transmittal of the International Preliminary Report on Patentability issued in PCT/US2015/17952 dated Sep. 15, 2016.
PCT International Search Report issued in PCT/US2015/017952 dated May 29, 2015.
Written Opinion of the International Searching Authority issued in PCT/US2015/017952 dated May 29, 2015.
Supplementary Search Report in European Patent Application 15 75 5626 dated Sep. 8, 2017.

* cited by examiner

*Primary Examiner* — John Zimmermann
(74) *Attorney, Agent, or Firm* — Marian E. Fundytus; Ostrolenk Faber LLP.

(57) ABSTRACT

The present invention provides digital printing inks comprising one or more acrylamides. Particularly preferred are inks containing diacetone acrylamide. The inks of the invention show good cure speed, blocking resistance, tack free cure, stability and resistance to blocking, and adhesion to the substrate. The inks of the invention are useful for replacing the currently used inks containing odiferous and toxic components.

23 Claims, 2 Drawing Sheets

DIGITAL PRINTING INKS

CROSS REFERENCE TO RELATED APPLICATIONS

The present application is a § 371 National Phase application based on PCT/US2015/017952 filed Feb. 27, 2015, which claims the benefit of U.S. Provisional Application Nos. 61/945,956, filed Feb. 28, 2014, and 61/977,787, filed Apr. 10, 2014, the subject matter of each of which is incorporated by reference in their entirety.

FIELD OF THE INVENTION

The present invention is directed to inks that have good cure speed, blocking resistance, tack free cure, stability, and adhesion to the substrate. The inks of the invention are useful for replacing the currently used inks containing odiferous and toxic components.

BACKGROUND

Digital printing inks, particularly inkjet and aerosol jet inks, can be applied to a variety of substrates to fulfill different market needs. In some markets, such as graphics for banners and side panels of vehicles, the inks are required to be very flexible, or cracking can result when the substrate is deformed. Traditional UV inkjet inks based on multifunctional monomers meet the technical needs of fast cure and good resistance properties, but are far too low in their flexibility and generally have poor adhesion properties to plastics, and so easily result in cracking and ink removal.

The use of very flexible inks based on monofunctional monomers is fundamentally unsatisfactory because of the very slow cure speeds, and the very low hardness and resistance properties that result. The biggest limitation is that the resultant inks are typically very tacky immediately after cure, and very prone to marking or set-off in a stack or roll. There is also a movement towards faster cure speed as inkjet heads develop greater capability, and as there are moves toward lower energy light sources such as light emitting diodes (LEDs) or lower power consumption medium pressure mercury lamps. This puts more pressure on the inkjet inks to be fast curing and tack free at low energy levels.

Many digital printing ink manufacturers have overcome these limitations of monofunctional only inks by combining the monofunctional monomer with a material such as N-vinyl caprolactam (NVC) or N-vinyl pyrrolidone (NVP) (see, for example, EP2399965 and US2012/0026235). These materials have the particular advantage of eliminating the surface tack and have become an essential part of modern formulating. However, NVP has been the subject of severe use restrictions in Europe for a number of years as a result of its adverse toxicology, and in particular the fact that it is suspected of causing cancer. The use of N-vinylcaprolactam in printing inks within Europe will now also be restricted based on a recently revised toxicity classification, with this material already not well liked within the marketplace because of the high odor that occurs on cure that is particularly apparent in the print room.

What is also known by those skilled in the art is that the advantageous adhesion benefits of using an ink based on monofunctional monomers in combination with N-vinyl materials such as NVP and NVC is quickly compromised by incorporation of multifunctional monomers, with the compromise to adhesion generally being greater with higher functionality monomers. Typically an ink based on monofunctional monomers and NVP or NVC would start to lose its broad spectrum adhesion profile at levels of difunctional monomer greater than 10 wt %, or levels of trifunctional and higher acrylate monomers greater than 5 wt %

In order to fulfill market requirements for digital printing inks it is also preferable to provide inks which either eliminate or contain small amounts of materials which are high odor and particularly offensive to the olfactory system, or materials which carry labeling classifications that would adversely affect the product labeling and perception of toxicity of inks in use. Examples of such monomers, which are known to have particularly high and unpleasant odor, and which should preferably be limited in any such digital printing ink formulations include: benzyl acrylate, 2-propyl heptyl acrylate, 2-carboxyethoxy acrylate, 2-methoxy ethyl acrylate, tetrahydrofurfuryl acrylate and monomers with cyclopentadienyl based structures such as dicyclopentyl acrylate, dicyclopentenyloxyethyl acrylate, dicyclopentanyl acrylate and dihydrocyclopentadienyl acrylate.

Other monomers which are known to have some adverse effect on odor, but which are not immediately unpleasant and can preferably be used at relatively low levels as part of a printing ink include, for example isobornyl acrylate, t-butyl cyclohexyl acrylate and 3,3,5-trimethyl cyclohexyl acrylate.

The EU regulation 1272/2008 ANNEX VI and subsequent amendments ("classification, labeling and packaging of substances mixtures"), commonly known as CLP, defines the toxicity categories for commercial chemicals within the EU. In addition, data is also available from individual suppliers according to the Regulation on Registration, Evaluation, Authorization and Restriction of Chemicals (REACH) registration requirements. Particularly problematic labeling for the perception of a printing ink in use would be the classifications concerned with skin, eye or respiratory system damage because of the potential to cause harm to a printer or other worker handling such materials. The most relevant and problematic labeling classifications in this regard, and acrylate monomers which trigger these labels, are listed below, and would typically trigger the ink to be labeled with a "corrosive" or "exploding chest" pictogram; H314, causes severe skin burns and eye damage (for example 2-ethoxyethoxyethylacrylate), H318, causes severe eye damage/irritation (for example 2-ethoxyethoxyethylacrylate, dipropylene glycol diacrylate, polyethylene glycol diacrylate and N-acryloyl morpholine (ACMO)) and H372 causes damage to organs through prolonged or repeated exposure (for example N-vinyl caprolactam)

The use of N-vinylcaprolactam is now particularly troublesome because despite its unique formulating properties, it's use in printing inks in Europe will be restricted based on a revised toxicity classification of H372, causes damage to organs through prolonged or repeated exposure, H319, causes serious eye irritation, H317, may cause allergenic skin reaction and H302, harmful if swallowed. It is well-known by those skilled in the art in the field of UV inkjet inks that the tertiary acrylamide UV monomer ACMO is a useful technical alternative (WO 2006041004), but even this is undesirable because of its severe eye irritancy and damage to organs through prolonged or repeated exposure classifications. Several other acrylamides are available commercially, such as those sold by KOHJIN Film and Chemicals Ltd, or MRC Unitec, but these too typically have toxicological concerns and should preferably be limited or avoided in ink-jet formulations. For example:

N,N-dimethyl acrylamide (H311, toxic in contact with the skin, H331, toxic if inhaled), N-hydroxyethyl acrylamide (H318 causes serious eye damage, H373 may cause damage to organs through prolonged or repeated exposure), N-isobutoxymethyl acrylamide (H311 toxic in contact with skin, H340 may cause genetic defects, H350 may cause cancer, H360 may damage fertility or the unborn child), N-(hydroxymethyl) acrylamide (H301 toxic if swallowed, H317 may cause allergenic skin reaction, H372 causes damage to organs through prolonged or repeated exposure, H350 may cause cancer, H340 may cause genetic defects, H361 suspected of damaging fertility or the unborn child)

What is clear is that there is currently no suitable approach to producing fast curing inkjet inks which do not contain N-vinyl compounds such as NVP and NVC or other substances of toxicological concern, and yet still have good adhesion and particularly low surface tack, which would prevent them from blocking in a stack or to the reverse of the next layer within a roll.

WO 2006/041004 describes a UV curable printing ink comprising an acrylamide monomer with a trifunctional or higher acrylate monomer. The trifunctional or higher acrylate monomer is present in high amounts. Inclusion of large amounts of a trifunctional or higher monomer would, as known by those skilled in the art, compromise the adhesion properties of the printing ink.

EP 2644664 provides an actinic radiation curable composition for use in an in-mold molded article. The composition includes at a minimum an oligomer, an acrylamide derivative, and an N-vinyl compound. The document describes only N-vinyl lactams, and most preferably N-vinylcaprolactam (NVC). NVC has a relatively high odor on cure and a poor toxicological profile. The examples include formulations that contain high levels of N-vinyl caprolactam and 2-ethoxyethoxyethyl acrylate (EOEOEA), which carry adverse product labeling, and high levels of the monomer dicyclopentanyl methacrylate (Fancryl FA-513M), which has a very unpleasant odor.

EP 2302007 describes ink compositions that include photoinitiators containing a 4-thiophenyl substituted benzophenone group within the structure. Compounds of the examples contain high levels of NVC, EOEOEA, tetrahydrofurfuryl acrylate (THFA), or dicyclopentenyloxyethyl acrylate (Fancryl FA-512A), all of which have an extremely unpleasant odor and/or carry adverse toxicological labeling.

EP 2505622 describes water-based UV curing ink jet inks comprising acrylamides. There is no disclosure of the potential use of acrylate monomers as part of the formulation.

U.S. Pat. No. 7,297,460 describes inkjet inks that contain polyhedral oligomeric silesquioxane (POSS), optionally substituted with secondary acrylamide or methacrylamide functional groups. All acrylamide compounds described are acrylamide functional POSS.

WO 2010/150023 discloses a UV ink that is curable by exposing the ink to UV radiation from an LED source, followed by UV radiation from a flash lamp. The application describes a UV ink that contains an N-vinylamide or an acrylamide (N-acryloyl amines), and defines ACMO as preferred. However, the working examples contain only NVC as an amide compound of this type. In addition, all the examples and claims deem that the inclusion of multifunctional monomers is desirable.

WO 2008/093071 discloses the use of a cyclic monofunctional acrylate monomer and an acyclic hydrocarbon monomer in inkjet ink. Reference is made to the use of N-vinyl amides and acrylamides. However, all the practical examples are based on NVC.

WO 2008/117,092 discloses use of an inkjet formulation that is resistant to blocking on a reel, and makes reference to the use of N-vinyl amides and acrylamides, and multifunctional acrylate monomers. All the examples are based on NVC. As discussed above, NVC has an unpleasant odor and adverse toxicological profile.

Thus, a need exists to develop an inkjet ink that has the desired properties, but does not contain, or contains a very small amount of, components with unpleasant odor and/or adverse toxicological profiles that are currently used.

SUMMARY OF THE INVENTION

In contrast to the problems of using N-vinylcaprolactam, the subject of the present invention includes the use of acrylamides, and in particular diacetone acrylamide, which is both low odor in comparison to N-vinylcaprolactam, and carries much more favorable labeling classifications.

What we have found, which is surprising and nonobvious, is that the use of the secondary acrylamide monomer diacetone acrylamide leads to an ink which has very low surface tack, high cure speed and good blocking resistance whilst also retaining relatively low odor on cure. This is particularly surprising based on the poorer performance of other similar monomers, such as N-isopropyl acrylamide (as claimed as the preferred material in EP 2644664) since diacetone acrylamide does not possess additional functional groups that would be recognized by those skilled in the art to be involved in the polymerization process. Other key properties of the cured inks such as adhesion and flexibility are also maintained using this invention.

In a certain aspect, the present invention provides a digital printing ink comprising:
  a) 1-60 wt % of an acrylamide material or blends thereof;
  b) 0-80 wt % of a monofunctional acrylate monomer or blends thereof;
  c) 0-10 wt % of a difunctional acrylate monomer or blends thereof;
  d) 0-5 wt % of a trifunctional or higher acrylate monomer or blends thereof;
  e) 0.1-25 wt % of a photoinitiator or blends thereof;
  f) 0-18 wt % of an amine synergist;
  g) 0-5 wt % of N-vinyl compounds; and
  h) 0-70 wt % water;
wherein the composition contains no N-vinyl caprolactam, N-vinyl pyrrolidone, or N-acryloyl morpholine.

In a certain aspect, the present invention provides a digital printing ink comprising:
  a) 1-60 wt % of an acrylamide material or blends thereof, wherein at least a portion of the acrylamide material is diacetone acrylamide;
  b) 0-80 wt % of a monofunctional acrylate monomer or blends thereof;
  c) 0-10 wt % of a difunctional acrylate monomer or blends thereof;
  d) 0-5 wt % of a trifunctional or higher acrylate monomer or blends thereof;
  e) 0.1-25 wt % of a photoinitiator or blends thereof;
  f) 0-18 wt % of an amine synergist;
  g) 0-5 wt % of N-vinyl compounds; and
  h) 0-70 wt % water;
wherein the composition contains no N-vinyl caprolactam, N-vinyl pyrrolidone, or N-acryloyl morpholine.

In a certain aspect, the present invention provides a water-based digital printing ink comprising:
  a) 0.5-60 wt % of an acrylamide material or blends thereof;
  b) 15-50 wt % of an acrylated polyurethane dispersion;
  c) 0-80 wt % of a monofunctional acrylate monomer or blends thereof;
  d) 0-10 wt % of a difunctional acrylate monomer or blends thereof;
  e) 0-5 wt % of a trifunctional or higher acrylate monomer or blends thereof;
  f) 0.1-25 wt % of a photoinitiator or blends thereof;
  g) 0-18 wt % of an amine synergist;
  h) 0-5 wt % of N-vinyl compounds;
  i) 1-80 wt % water; and
  j) 0-30 wt % of a water-compatible organic solvent;
wherein the composition contains no N-vinyl caprolactam, N-vinyl pyrrolidone, or N-acryloyl morpholine.

In a certain aspect, the present invention provides a water-based digital printing ink comprising:
  a) 0.5-60 wt % of an acrylamide material or blends thereof, wherein at least a portion of the acrylamide material is diacetone acrylamide;
  b) 15-50 wt % of an acrylated polyurethane dispersion;
  c) 0-80 wt % of a monofunctional acrylate monomer or blends thereof;
  d) 0-10 wt % of a difunctional acrylate monomer or blends thereof;
  e) 0-5 wt % of a trifunctional or higher acrylate monomer or blends thereof;
  f) 0.1-25 wt % of a photoinitiator or blends thereof;
  g) 0-18 wt % of an amine synergist;
  h) 0-5 wt % of N-vinyl compounds;
  i) 1-80 wt % water; and
  j) 0-30 wt % of a water-compatible organic solvent;
wherein the composition contains no N-vinyl caprolactam, N-vinyl pyrrolidone, or N-acryloyl morpholine.

In certain embodiments, the acrylamide material is selected from the group consisting of diacetone acrylamide, N-isobutoxymethyl acrylamide, N-isopropyl acrylamide, N,N'-methylene bisacrylamide, or 2-(prop-2-enamido)ethylacetate, or a combination thereof.

In another embodiment, the majority of the acrylamide material is diacetone acrylamide.

In another embodiment, all of the acrylamide material comprises diacetone acrylamide.

In certain embodiments, the monofunctional acrylate monomer, or blends thereof, comprises no more than 25 wt % of isobornyl acrylate, t-butyl cyclohexyl acrylate or 3,3,5-trimethyl cyclohexyl acrylate.

In certain embodiments, the monofunctional monomer, or blends thereof, comprises 0.1-20 wt % of isobornyl acrylate, t-butyl cyclohexyl acrylate and 3,3,5-trimethyl cyclohexyl acrylate.

In certain embodiments, the monofunctional monomer, or blends thereof, comprises 0.1-10 wt % of isobornyl acrylate, t-butyl cyclohexyl acrylate or 3,3,5-trimethyl cyclohexyl acrylate.

In certain embodiments, the monofunctional monomer, or blends thereof, comprises 0.1-5 wt % of isobornyl acrylate, t-butyl cyclohexyl acrylate or 3,3,5-trimethyl cyclohexyl acrylate.

In certain embodiments, the monofunctional monomer, or blends thereof, contains no isobornyl acrylate, t-butyl cyclohexyl acrylate or 3,3,5-trimethyl cyclohexyl acrylate.

In certain embodiments, the ink contains no N-vinyl compounds.

In certain embodiments, the ink contains no difunctional or higher monomers.

In one embodiment, the photoinitiator is present in an amount of 0.1-20 wt %.

In one embodiment, the water is present in an amount of 20-80 wt %.

In another embodiment, the water is present in an amount of 60-70 wt %.

In another embodiment, the water is present in an amount of 30-70 wt %.

In another embodiment, the water is present in an amount of 40-50 wt %.

In another embodiment, the water is present in an amount of 20-30 wt %.

In one embodiment, the solvent is present in an amount of 1-30 wt %.

In another embodiment, the solvent is present in an amount of 1-20 wt %.

In certain embodiments, the acrylated polyurethane dispersion is present in an amount of 20-30 wt %.

In one embodiment, the acrylamide material is present in an amount of 0.5-40 wt % of the ink.

In another embodiment, the acrylamide material is present in an amount of 0.5-30 wt % of the ink.

In another embodiment, the acrylamide material is present in an amount of 0.5-20 wt % of the ink.

In another embodiment, the acrylamide material is present in an amount of 0.5-10 wt % of the ink.

In another embodiment, the acrylamide material is present in an amount of 0.5-5 wt % of the ink.

In one embodiment, the ink further comprises a colorant.

In one embodiment, the ink further comprises one or more additives selected from the group consisting of stabilizers, surfactants, defoamers, slip additives, wetting additives and synergists.

In one embodiment, the ink is an ink jet ink.

In another embodiment, the ink is an aerosol jet ink.

In a particular aspect, the present invention provides a method of making a digital ink, comprising mixing:
  a) 1-60 wt % of an acrylamide material or blends thereof;
  b) 0-80 wt % of a monofunctional acrylate monomer or blends thereof;
  c) 0-10 wt % of a difunctional acrylate monomer or blends thereof;
  d) 0-5 wt % of a trifunctional or higher acrylate monomer or blends thereof;
  e) 0.1-25 wt % of a photoinitiator or blends thereof;
  f) 0-18 wt % of an amine synergist;
  g) 0-5 wt % of N-vinyl compounds; and
  h) 0-70 wt % water;
wherein the composition contains no N-vinyl caprolactam, N-vinyl pyrrolidone, or N-acryloyl morpholine.

In a particular aspect, the present invention provides a method of making a digital ink, comprising mixing:
  a) 1-60 wt % of an acrylamide material or blends thereof, wherein at least a portion of the acrylamide material is diacetone acrylamide;
  b) 0-80 wt % of a monofunctional acrylate monomer or blends thereof;
  c) 0-10 wt % of a difunctional acrylate monomer or blends thereof;
  d) 0-5 wt % of a trifunctional or higher acrylate monomer or blends thereof;
  e) 0.1-25 wt % of a photoinitiator or blends thereof;
  f) 0-18 wt % of an amine synergist;
  g) 0-5 wt % of N-vinyl compounds; and
  h) 0-70 wt % water;

wherein the composition contains no N-vinyl caprolactam, N-vinyl pyrrolidone, or N-acryloyl morpholine.

In a particular aspect, the present invention provides a method of making a water-based digital printing ink, comprising mixing:
- a) 0.5-60 wt % of an acrylamide material or blends thereof;
- b) 15-50 wt % of an acrylated polyurethane dispersion;
- c) 0-80 wt % of a monofunctional acrylate monomer or blends thereof;
- d) 0-10 wt % of a difunctional acrylate monomer or blends thereof;
- e) 0-5 wt % of a trifunctional or higher acrylate monomer or blends thereof;
- f) 0.1-25 wt % of a photoinitiator or blends thereof;
- g) 0-18 wt % of an amine synergist;
- h) 0-5 wt % of N-vinyl compounds;
- i) 1-80 wt % water; and
- j) 0-30 wt % of a water-compatible organic solvent;

wherein the composition contains no N-vinyl caprolactam, N-vinyl pyrrolidone, or N-acryloyl morpholine.

In a particular aspect, the present invention provides a method of making a water-based digital printing ink, comprising mixing:
- a) 0.5-60 wt % of an acrylamide material or blends thereof, wherein at least a portion of the acrylamide material is diacetone acrylamide;
- b) 15-50 wt % of an acrylated polyurethane dispersion;
- c) 0-80 wt % of a monofunctional acrylate monomer or blends thereof;
- d) 0-10 wt % of a difunctional acrylate monomer or blends thereof;
- e) 0-5 wt % of a trifunctional or higher acrylate monomer or blends thereof;
- f) 0.1-25 wt % of a photoinitiator or blends thereof;
- g) 0-18 wt % of an amine synergist;
- h) 0-5 wt % of N-vinyl compounds;
- i) 1-80 wt % water; and
- j) 0-30 wt % of a water-compatible organic solvent;

wherein the composition contains no N-vinyl caprolactam, N-vinyl pyrrolidone, or N-acryloyl morpholine.

In one aspect, the present invention provides a use of the digital printing ink, comprising printing the ink onto a substrate.

In one aspect, the present invention provides a printed article comprising the digital ink.

DETAILED DESCRIPTION OF THE INVENTION

Figure 1:
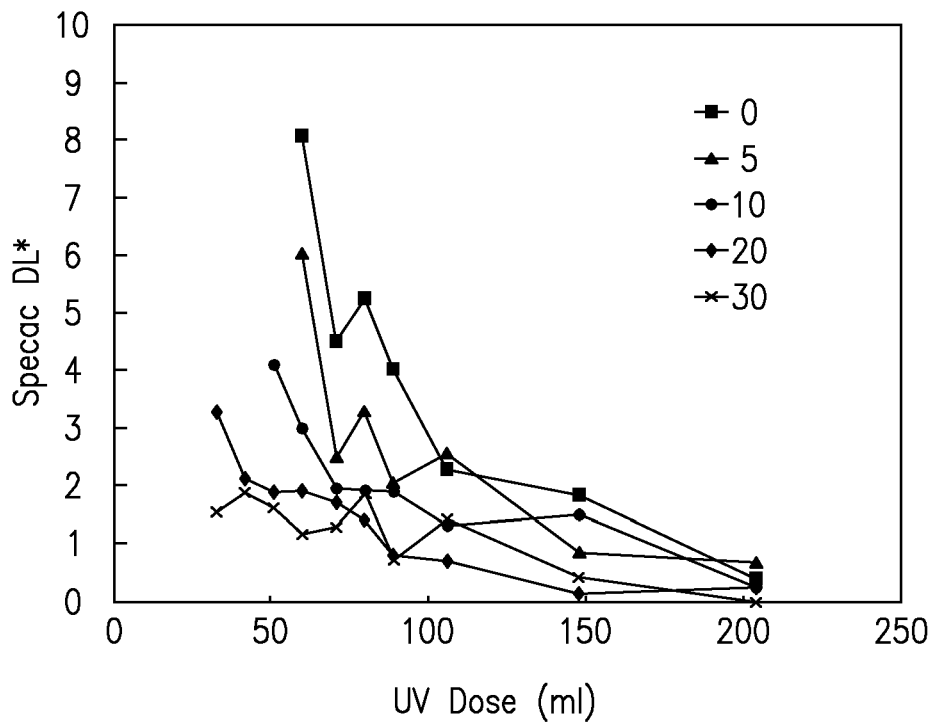
FIG. 1: Shows the effect of increasing concentrations of diacetone acrylamide (0-30%) on the effective radiation cure dose for inks 2A-2E.

It is to be understood that the foregoing general description and the following detailed description are exemplary and explanatory only, and are not restrictive of any subject matter claimed.

Unless defined otherwise, all technical and scientific terms used herein have the same meaning as is commonly understood by one of skill in the art to which the inventions belong. All patents, patent applications, published applications and publications, websites and other published materials referred to throughout the entire disclosure herein, unless noted otherwise, are incorporated by reference in their entirety for any purpose.

In this application, the use of the singular includes the plural unless specifically stated otherwise. As used herein, the singular forms "a," "an" and "the" are intended to include the plural forms as well, unless the context clearly indicates otherwise.

In this application, the use of "or" means "and/or" unless stated otherwise.

As used herein, the terms "comprises" and/or "comprising" specify the presence of the stated features, integers, steps, operations, elements, and/or components, but do not preclude the presence or addition of one or more other features, integers, steps, operations, elements, components, and/or groups thereof. Furthermore, to the extent that the terms "includes," "having," "has," "with," "composed," "comprised" or variants thereof are used in either the detailed description or the claims, such terms are intended to be inclusive in a manner similar to the term "comprising."

As used herein, ranges and amounts can be expressed as "about" a particular value or range. "About" is intended to also include the exact amount. Hence "about 5 percent" means "about 5 percent" and also "5 percent." "About" means within typical experimental error for the application or purpose intended.

As used herein, the term "monofunctional acrylate monomer" refers to a monomer containing one functional acrylate group.

As used herein, the term "multifunctional acrylate monomer" refers to a monomer having two or more functional acrylate groups.

As used herein, the term "difunctional acrylate monomer" refers to a monomer containing two functional acrylate groups.

As used herein, the term "trifunctional acrylate monomer" refers to a monomer containing three functional acrylate groups.

As used herein, the term "or higher" when referring to an acrylate monomer means a monomer containing greater than three functional acrylate groups.

As used herein, the terms "(meth)acrylate" and "(meth) acrylic acid" include both the acrylate and methacrylate compounds.

As used herein, the term "ethoxylated" refers to chain extended compounds through the use of ethylene oxide.

As used herein, the term "propoxylated" refers to chain extended compounds through the use of propolyene oxide.

As used herein, the term "alkoxylated" refers to chain extended compounds using either or both ethylene oxide and propylene oxide.

Throughout this disclosure, all parts and percentages are by weight (wt % or mass % based on the total weight) and all temperatures are in ° C. unless otherwise indicated.

In a certain aspect, the present invention provides a digital printing ink comprising:
- a) 1-60 wt % of an acrylamide material or blends thereof;
- b) 0-80 wt % of a monofunctional acrylate monomer or blends thereof;
- c) 0-10 wt % of a difunctional acrylate monomer or blends thereof;

d) 0-5 wt % of a trifunctional or higher acrylate monomer or blends thereof;
e) 0.1-25 wt % of a photoinitiator or blends thereof;
f) 0-18 wt % of an amine synergist;
g) 0-5 wt % of N-vinyl compounds; and
h) 0-70 wt % water;

wherein the composition contains no N-vinyl caprolactam, N-vinyl pyrrolidone, or N-acryloyl morpholine.

In a certain aspect, the present invention provides a digital printing ink comprising:
a) 1-60 wt % of an acrylamide material or blends thereof, wherein at least a portion of the acrylamide material is diacetone acrylamide;
b) 0-80 wt % of a monofunctional acrylate monomer or blends thereof;
c) 0-10 wt % of a difunctional acrylate monomer or blends thereof;
d) 0-5 wt % of a trifunctional or higher acrylate monomer or blends thereof;
e) 0.1-25 wt % of a photoinitiator or blends thereof;
f) 0-18 wt % of an amine synergist;
g) 0-5 wt % of N-vinyl compounds; and
h) 0-70 wt % water;

wherein the composition contains no N-vinyl caprolactam, N-vinyl pyrrolidone, or N-acryloyl morpholine.

In a certain aspect, the present invention provides a water-based digital printing ink comprising:
a) 0.5-60 wt % of an acrylamide material or blends thereof;
b) 15-50 wt % of an acrylated polyurethane dispersion;
c) 0-80 wt % of a monofunctional acrylate monomer or blends thereof;
d) 0-10 wt % of a difunctional acrylate monomer or blends thereof;
e) 0-5 wt % of a trifunctional or higher acrylate monomer or blends thereof;
f) 0.1-25 wt % of a photoinitiator or blends thereof;
g) 0-18 wt % of an amine synergist;
h) 0-5 wt % of N-vinyl compounds;
i) 1-80 wt % water; and
j) 0-30 wt % of a water-compatible organic solvent;

wherein the composition contains no N-vinyl caprolactam, N-vinyl pyrrolidone, or N-acryloyl morpholine.

In a certain aspect, the present invention provides a water-based digital printing ink comprising:
a) 0.5-60 wt % of an acrylamide material or blends thereof, wherein at least a portion of the acrylamide material is diacetone acrylamide;
b) 15-50 wt % of an acrylated polyurethane dispersion;
c) 0-80 wt % of a monofunctional acrylate monomer or blends thereof;
d) 0-10 wt % of a difunctional acrylate monomer or blends thereof;
e) 0-5 wt % of a trifunctional or higher acrylate monomer or blends thereof;
f) 0.1-25 wt % of a photoinitiator or blends thereof;
g) 0-18 wt % of an amine synergist;
h) 0-5 wt % of N-vinyl compounds;
i) 1-80 wt % water; and
j) 0-30 wt % of a water-compatible organic solvent;

wherein the composition contains no N-vinyl caprolactam, N-vinyl pyrrolidone, or N-acryloyl morpholine.

In a particular aspect, the present invention provides a method of making a digital ink, comprising mixing:
a) 1-60 wt % of an acrylamide material or blends thereof;
b) 0-80 wt % of a monofunctional acrylate monomer or blends thereof;
c) 0-10 wt % of a difunctional acrylate monomer or blends thereof;
d) 0-5 wt % of a trifunctional or higher acrylate monomer or blends thereof;
e) 0.1-25 wt % of a photoinitiator or blends thereof;
f) 0-18 wt % of an amine synergist;
g) 0-5 wt % of N-vinyl compounds; and
h) 0-70 wt % water;

wherein the composition contains no N-vinyl caprolactam, N-vinyl pyrrolidone, or N-acryloyl morpholine.

In a certain aspect, the present invention provides a method of making a digital ink, comprising mixing:
a) 1-60 wt % of an acrylamide material or blends thereof, wherein at least a portion of the acrylamide material is diacetone acrylamide;
b) 0-80 wt % of a monofunctional acrylate monomer or blends thereof;
c) 0-10 wt % of a difunctional acrylate monomer or blends thereof;
d) 0-5 wt % of a trifunctional or higher acrylate monomer or blends thereof;
e) 0.1-25 wt % of a photoinitiator or blends thereof;
f) 0-18 wt % of an amine synergist;
g) 0-5 wt % of N-vinyl compounds; and
h) 0-70 wt % water;

wherein the composition contains no N-vinyl caprolactam, N-vinyl pyrrolidone, or N-acryloyl morpholine.

In a particular aspect, the present invention provides a method of making a water-based digital printing ink, comprising mixing:
a) 0.5-60 wt % of an acrylamide material or blends thereof;
b) 15-50 wt % of an acrylated polyurethane dispersion;
c) 0-80 wt % of a monofunctional acrylate monomer or blends thereof;
d) 0-10 wt % of a difunctional acrylate monomer or blends thereof;
e) 0-5 wt % of a trifunctional or higher acrylate monomer or blends thereof;
f) 0.1-25 wt % of a photoinitiator or blends thereof;
g) 0-18 wt % of an amine synergist;
h) 0-5 wt % of N-vinyl compounds;
i) 1-80 wt % water; and
j) 0-30 wt % of a water-compatible organic solvent;

wherein the composition contains no N-vinyl caprolactam, N-vinyl pyrrolidone, or N-acryloyl morpholine.

In a particular aspect, the present invention provides a method of making a water-based digital printing ink, comprising mixing:
a) 0.5-60 wt % of an acrylamide material or blends thereof, wherein at least a portion of the acrylamide material is diacetone acrylamide;
b) 15-50 wt % of an acrylated polyurethane dispersion;
c) 0-80 wt % of a monofunctional acrylate monomer or blends thereof;
d) 0-10 wt % of a difunctional acrylate monomer or blends thereof;
e) 0-5 wt % of a trifunctional or higher acrylate monomer or blends thereof;
f) 0.1-25 wt % of a photoinitiator or blends thereof;
g) 0-18 wt % of an amine synergist;
h) 0-5 wt % of N-vinyl compounds;
i) 1-80 wt % water; and
j) 0-30 wt % of a water-compatible organic solvent;

wherein the composition contains no N-vinyl caprolactam, N-vinyl pyrrolidone, or N-acryloyl morpholine.

It is the intention of the present invention to provide energy curable inks, especially digital inks, which comprise an acrylamide, or combination of acrylamides. In a preferred embodiment, the acrylamide would be diacetone acrylamide either alone, or in combination with other acrylamides. More preferred would be an ink where the diacetone acrylamide is either the only acrylamide material present in the ink or is the majority of the acrylamide present in the ink.

It is a further intention of the present invention to provide energy curable inks, especially digital inks, which are based on monofunctional monomers. If difunctional monomers are used, they would preferably be used at 10 wt % or less, more preferably at 5 wt % or less. If trifunctional (or higher) monomers are used, they would preferably be used at 5 wt % or less, more preferably at 2.5 wt % or less.

It is a further intention of the present invention to provide energy curable inks, especially digital inks, which are preferably free of any N-vinyl compounds (especially N-vinyl caprolactam (NVC) and N-vinyl pyrrolidone (NVP)). If N-vinyl compounds are present, they would preferably be used at 10 wt % or less, more preferably at 5 wt % or less, even more preferably at 2 wt % or less, and most preferably eliminated altogether from the formulations.

The monomer diacetone acrylamide provides very fast curing, particularly with reference to "surface tack". Somewhat surprisingly, compared to other similar low molecular weight acrylamides, it also cures at lower doses despite an absence of any other recognized polymerizable groups within the structure. These properties make it a technically suitable alternative to the widely used N-vinyl caprolactam.

The hazard classification of the commercial monomer N-vinyl caprolactam has recently changed and, by agreement with the European Printing Ink Association (EuPIA), ink suppliers are obliged to remove this material from their formulations. NVC is generally regarded as a unique monomer with no viable alternatives.

The use of diacetone acrylamide as part of a preferably monofunctional ink formulation gives fast, tack-free curing. Unlike many acrylamide compounds, it also has a very favorable toxicology profile and a low hazard classification based on toxicology data from its widespread commercial use in water-based emulsion polymer formulations.

The present invention is drawn to digital printing inks comprising one or more acrylamides, preferably diacetone acrylamide either alone or in combination with other acrylamides, that are very effective in providing fast curing and an unusually hard tack-free surface, which makes the inks far more resistant to blocking/setting off in a stack or reel. The inks also have excellent adhesion properties.

The energy curable inks covered by the present invention preferably show a reduced tendency to block (i.e. to transfer color in a stack or reel) by virtue of being very hard and fast curing. Preferably, this does not come at the expense of either the flexibility or the adhesion. The inks preferably contain 1-40%, more preferably 1-30% of one or more acrylamide materials, preferably comprising diacetone acrylamide either alone or in combination with other acrylamides, along with other monofunctional or multifunctional acrylate monomers dependent on the balance of properties being sought, but would preferably be of a low odor nature.

Preferably, the inks of the present invention would contain less than 20% of materials which are high odor and particularly offensive to the olfactory system, or materials which carry labeling classifications that would adversely affect the product labeling and perception of toxicity of inks in use, more preferably less than 10%, even more preferably less than 5%, and most preferably less than 1%. Examples of such monomers, which are known to have particularly high and unpleasant odor, and which should preferably be limited in any such digital printing ink formulations include; benzyl acrylate, 2-propyl heptyl acrylate, 2-carboxyethoxy acrylate, 2-methoxy ethyl acrylate, tetrahydrofurfuryl acrylate and monomers with cyclopentadienyl based structures such as dicyclopentyl acrylate, dicyclopentenyloxyethyl acrylate, dicyclopentanyl acrylate and dihydrocyclopentadienyl acrylate.

Other monomers which are known to have some adverse effect on odor, but which are not immediately unpleasant and can preferably be used at relatively low levels as part of a printing ink include, for example, isobornyl acrylate, t-butyl cyclohexyl acrylate and 3,3,5-trimethyl cyclohexyl acrylate. These materials would preferably be used at less than 20 wt %, more preferably at less than 15 wt %

It is understood that the inks of the present formulation could contain virtually any raw materials that are compatible with energy curable and water-based ink systems. A partial list of some of the classes of materials that could be used to formulate the inks of the present invention is included below.

The ink composition according to the present invention may include water. This would preferably not contain ionic impurities, and is therefore preferably ion exchanged or distilled water. Particularly for water-based compositions, the quantity of water used according to the present invention, including that which is supplied as part of raw materials used, is preferably 20 to 80 wt %, more preferably 30 to 70 wt % by mass according to the entire ink composition.

The ink may also contain one or more water-compatible organic solvents, preferably at a level of between 1 and 30 wt %, more preferably 1 to 20 wt % by mass according to the entire ink composition, which have a primary function as a humectant, preventing drying of the ink in the inkjet heads and thus preventing them from clogging, and a secondary function as a wetting aid, allowing the inkjet drops to spread on the substrate. Examples of suitable solvents would include materials which are not highly flammable or volatile, typically an alkylene glycol ether or ether acetate type, with the following non-limiting examples: 4-hydroxy-4-methyl-2-pentanone, diethylene glycol butyl ether, diethylene glycol ethyl ether, diethylene glycol methyl ether, diethylene glycol monoethyl ether acetate, diethylene glycol monopropyl ether, dipropylene glycol ethyl ether, dipropylene glycol methyl ether, ethylene glycol butyl ether, ethylene glycol ethyl ether, ethylene glycol isopropyl ether, ethylene glycol methyl ether, ethylene glycol propyl ether, glycerine carbonate, N-methyl 2-pyrrolidone, propylene glycol, propylene glycol ethyl ether, propylene glycol ethyl ether acetate, propylene glycol methyl ether, propylene glycol n-propyl ether, triethylene glycol butyl ether, triethylene glycol methyl ether, tripropylene glycol and tripropylene glycol methyl ether.

Examples of suitable monofunctional ethylenically unsaturated monomers include, but are not limited, to the following: isobutyl acrylate; cyclohexyl acrylate; iso-octyl acrylate; n-octyl acrylate; isodecyl acrylate; iso-nonyl acrylate; octyl/decyl acrylate; lauryl acrylate; 2-propyl heptyl acrylate; tridecyl acrylate; hexadecyl acrylate; stearyl acrylate; iso-stearyl acrylate; behenyl acrylate; tetrahydrofurfuryl acrylate; 4-t.butyl cyclohexyl acrylate; 3,3,5-trimethyl-cyclohexane acrylate; isobornyl acrylate; dicyclopentyl acrylate; dihydrodicyclopentadienyl acrylate; dicyclopentenyloxyethyl acrylate; dicyclopentanyl acrylate; benzyl acrylate; phenoxyethyl acrylate; 2-hydroxy-3-phenoxypropyl acrylate; alkoxylated nonylphenol acrylate; cumyl phenoxyethyl acrylate; cyclic trimethylolpropane formal acrylate; 2(2-ethoxyethoxy) ethyl acrylate; polyethylene glycol monoacrylate; polypropylene glycol monoacrylate; caprolactone acrylate; ethoxylated methoxy polyethylene glycol acrylate; methoxy triethylene glycol acrylate; tripropyleneglycol monomethyl ether acrylate; diethyleneglycol butyl ether acrylate; alkoxylated tetrahydrofurfuryl acrylate; ethoxylated ethyl hexyl acrylate; alkoxylated phenol acrylate; ethoxylated phenol acrylate; ethoxylated nonyl phenol acrylate; propoxylated nonyl phenol acylate; polyethylene glycol o-phenyl phenyl ether acrylate; ethoxylated p-cumyl phenol acrylate; ethoxylated nonyl phenol acrylate; alkoxylated lauryl acrylate; ethoxylated tristyrylphenol acrylate; N-(acryloyloxyethyl)hexahydrophthalimide; N-butyl 1,2 (acryloyloxy) ethyl carbamate; acryloyl oxyethyl hydrogen succinate; octoxypolyethylene glycol acrylate; octafluoropentyl acrylate; 2-isocyanato ethyl acrylate; acetoacetoxy ethyl acrylate; 2-methoxyethyl acrylate; dimethyl aminoethyl acrylate; 2-carboxyethyl acrylate; 4-hydroxy butyl acrylate; combinations thereof, and the like. As used herein, the term ethoxylated refers to chain extended compounds through the use of ethylene oxide, propoxylated refers to chain extended compounds through the use of propylene oxide, and alkoxylated refers to chain extended compounds using either or both ethylene oxide and propylene oxide. Equivalent methacrylate compounds are also capable of being used, although those skilled in the art will appreciate that methacrylate compounds have lower reactivity than their equivalent acrylate counterparts:

Examples of suitable multifunctional ethylenically unsaturated monomers include but are not limited to the following: 1,3-butylene glycol diacrylate; 1,4-butanediol diacrylate; neopentyl glycol diacrylate; ethoxylated neopentyl glycol diacrylate; propoxylated neopentyl glycol diacrylate; 2-methyl-1,3-propanediyl ethoxy acrylate; 2-methyl-1,3-propanediol diacrylate; ethoxylated 2-methyl-1,3-propanediol diacrylate; 3 methyl 1,5-pentanediol diacrylate; 2-butyl-2-ethyl-1,3-propanediol diacrylate; 1,6-hexanediol diacrylate; alkoxylated hexanediol diacrylate; ethoxylated hexanediol diacrylate; propoxylated hexanediol diacrylate; 1,9-nonanediol diacrylate; 1,10 decanediol diacrylate; ethoxylated hexanediol diacrylate; alkoxylated hexanediol diacrylate; diethyleneglycol diacrylate; triethylene glycol diacrylate; tetraethylene glycol diacrylate; polyethylene glycol diacrylate; propoxylated ethylene glycol diacrylate; dipropylene glycol diacrylate; tripropyleneglycol diacrylate; polypropylene glycol diacrylate; poly (tetramethylene glycol) diacrylate; cyclohexane dimethanol diacrylate; ethoxylated cyclohexane dimethanol diacrylate; alkoxylated cyclohexane dimethanol diacrylate; polybutadiene diacrylate; hydroxypivalyl hydroxypivalate diacrylate; tricyclodecanedimethanol diacrylate; 1,4-butanediylbis[oxy(2-hydroxy-3,1-propanediyl)]diacrylate; ethoxylated bisphenol A diacrylate; propoxylated bisphenol A diacrylate; propoxylated ethoxylated bisphenol A diacrylate; ethoxylated bisphenol F diacrylate; 2-(2-vinyloxyethoxy)ethyl acrylate; dioxane glycol diacrylate; ethoxylated glycerol triacrylate; glycerol propoxylate triacrylate; pentaerythritol triacrylate; trimethylolpropane triacrylate; caprolactone modified trimethylol propane triacrylate; ethoxylated trimethylolpropane triacrylate; propoxylated trimethylol propane triacrylate; tris (2-hydroxy ethyl) isocyanurate triacrylate; e-caprolactone modified tris (2-hydroxy ethyl) isocyanurate triacrylate; melamine acrylate oligomer; pentaerythritol tetraacrylate; ethoxylated pentaerythritol tetraacrylate; di-trimethylolpropane tetra acrylate; dipentaerythritol pentaacrylate; dipentaerythritol hexaacrylate; ethoxylated dipentaerythritol hexaacrylate; combinations thereof, and the like. The term ethoxylated refers to chain extended compounds through the use of ethylene oxide, propoxylated refers to chain extended compounds through the use of propylene oxide, and alkoxylated refers to chain extended compounds using either or both ethylene oxide and propylene oxide. Equivalent methacrylate compounds are also capable of being used, although those skilled in the art will appreciate that methacrylate compounds have lower reactivity than their equivalent acrylate counterparts.

Other functional monomer classes capable of being used in part in these formulations include cyclic lactam such as N-vinyl caprolactam; N-vinyl oxazolidinone and N-vinyl pyrrolidone, and secondary or tertiary acrylamides such as N-acryloyl morpholine; diacetone acrylamide; N-methyl acrylamide; N-ethyl acrylamide; N-isopropyl acrylamide; N-t-butyl acrylamide; N-hexyl acrylamide; N-cyclohexyl acrylamide; N-octyl acrylamide; N-t-octyl acrylamide; N-dodecyl acrylamide; N-benzyl acrylamide; N-(hydroxymethyl)acrylamide; N-isobutoxymethyl acrylamide; N-butoxymethyl acrylamide; N,N-dimethyl acrylamide; N,N-diethyl acrylamide; N,N-propyl acrylamide; N,N-dibutyl acrylamide; N,N-dihexyl acrylamide; N,N-dimethylamino methyl acrylamide; N,N-dimethylamino ethyl acrylamide; N,N-dimethylamino propyl acrylamide; N,N-dimethylamino hexyl acrylamide; N,N-diethylamino methyl acrylamide; N,N-diethylamino ethyl acrylamide; N,N-diethylamino propyl acrylamide; N,N-dimethylamino hexyl acrylamide; and N,N'-methylenebisacrylamide.

Suitable acrylated polyurethane dispersions include MS 10/1312 and MS 10/1311 from Allnex; Neorad R-440, R-441, R-444, R-447, R-448, R-465, UV-14, UV-20, UV-65, UV-TN6711 (DSM), Laromer LR8949, LR8983, LR9005, UA9059, UA9060, UA9064, and UA9095 from BASF; and Bayhydrol UV 2282, UV 2317, UV VP LS 2280, UV VP LS 2317, UV XP 2629, UV XP 2687, UV XP 2689, UV XP 2690, and UV XP 2775 from Bayer.

Suitable acrylate and non-functional resin technologies include acrylated polyester dispersions such as the Laromer PE range from BASF; water soluble epoxy acrylates such as Laromer 8765 from BASF and CN132 from Sartomer; styrene maleic anhydride adducts (SMA) where the anhydride group of a styrene-maleic copolymer is reacted with a OH-functional monomer; acetoacetate-functional polymers such as acetoacetate-functional poly(vinyl alcohol) Gohsenx Z from Nippon Gohsei; acrylic emulsions such as those sold under the trade names Joncryl (BASF), Revacryl (Synthomer), Hycar (Lubrizol), Neocryl (DSM), Neboplast (Necarbo), and the Picassian AC range (Picassian Polymers); solution acrylics such as those sold under the trade names Joncryl (BASF), poly(meth)acrylic acid such as those sold under the trade name Sokalan (BASF); polyurethane dispersions such as those sold under the trade names Sancure (Lubrizol), Syntegra (Dow), Luplen (BASF), and Beetafin (BIP); polyester emulsions such as those sold under the trade names Eastek (Eastman), PVC Emulsions such as those sold under the trade names Vycar (Lubrizol); polyamide dispersions such as those sold under the trade names Casamid (Thomas Swann) and Hydrosize (Michelman); waterbased alkyds such as those sold under the trade names Synaqua (Arkema); poly(vinyl alcohol) such as those sold by Kuraray, Nippon Gohsei & Celanese; polyethylene glycols; poly(vinyl) pyrrolidones such as those sold under the trade names PVP-K15, K30, K60, K90 (ISP); maleic resins such as those sold under the trade names Hydrorez (Lawter); and natural resins such as waterbased shellacs (Worlee), Procote (DOW), and Revertex (Synthomer). These various resin types may, where applicable, be neutralized using organic bases including but not limited to ammonia, triethanolamine, triisopropanolamine, dimethyl aminoethanol or arginine. Alternatively, they may be neutralised by an inorganic base including, but not limited to, alkali metal oxides, alkali metal hydroxides or alkali metal carbonates, with sodium hydroxide or potassium hydroxide being the preferred inorganic bases.

Suitable photoinitiators include, but are not limited to, the following: α-hydroxyketones, including, but not limited to, 1-hydroxy-cyclohexyl-phenyl-ketone, 2-hydroxy-2-methyl-1-phenyl-1-propanone; 2-hydroxy-1-{4-[4-(2-hydroxy-2-methyl-propionyl)-benzyl]-phenyl}-2-methyl-propan-1-one; and 2-hydroxy-1-[4-(2-hydroxyethoxy)phenyl]-2-methyl-1-propanone; acylphosphine oxides including, but not limited to 2,4,6-trimethylbenzoyl-diphenylphosphine oxide; 2,4,6-trimethylbenzoyl-diphenyl phosphinate; and bis-(2,4,6-trimethylbenzoyl)-phenylphosphine oxide; and α-aminoketones including, but not limited to, 2-methyl-1-[4-methylthio)phenyl]-2-morpholinopropan-1-one; 2-benzyl-2-dimethylamino-1-(4-morpholinophenyl)-butan-1-one; and 2-dimethylamino-2-(4-methyl-benzyl)-1-(4-morpholin-4-yl-phenyl)-butan-1-one; combinations thereof, and the like.

Examples of other suitable photoinitiators include benzyl dimethyl ketal; thioxanthone initiators such as 2-4-diethylthioxanthone, isopropylthioxanthone, 2-chlorothioxanthone, and 1-chloro-4-propoxythioxanthone; benzophenone initiators such as benzophenone, 4-phenylbenzophenone, 4-methylbenzophenone, 4-hydroxy benzophenone, and 4-carboxymethoxy benzophenone; methyl-2-benzoylbenzoate; 4-benzoyl-4-methyldiphenyl sulphide; phenylglyoxylate initiators such as phenyl glyoxylic acid methyl ester, oxy-phenyl-acetic acid 2-[2-hydroxy-ethoxy]-ethyl ester, or oxy-phenyl-acetic acid 2-[2-oxo-2-phenyl-acetoxy-ethoxy]-ethyl ester; titanocen radical initiators such as titanium-bis (η5-2,4-cyclopentadien-1-yl)-bis-[2,6-difluoro-3-(1H-pyrrol-1-yl)phenyl]; oxime ester radical initiators such as [1-(4-phenylsulfanylbenzoyl)heptylideneamino]benzoate, or [1-[9-ethyl-6-(2-methylbenzoyl)carbazol-3-yl]-ethylideneamino]acetate; plus others including methyl benzoylformate; 1-phenyl-1,2-propanedione-2-(O-ethoxycarbonyl)oxime; 4,4,4-(hexyamethyltriamino)triphenyl methane; 2-benzyl-2-dimethylamino-4-morpholinobutyrophenone; 2-methyl-1-(4-methylthiophenyl)-2-morpholinopropan-1-one; 4,4-bis(diethylamino)benzophenone; 2-ethyl anthraquinone; and the like.

Polymeric photoinitiators are also suitable, including, for example, polymeric aminobenzoates (GENOPOL AB-1 from Rahn, Omnipol ASA from IGM or Speedcure 7040 from Lambson), polymeric benzophenone derivatives (GENOPOL BP-1 from Rahn, Omnipol BP from IGM or Speedcure 7005 from Lambson), polymeric thioxanthone derivatives (GENOPOL TX-1 from Rahn, Omnipol TX from IGM or Speedcure 7010 from Lambson), and α-hydroxyketones (polyethylene glycol mono-4-(2-hydroxy-2-methyl propiophenone) ether).

An amine synergist may also be included in the ink formulation. Suitable examples include, but are not limited to, the following: ethyl-4-(dimethylamino)benzoate; 2-ethylhexyl-4-(dimethylamino)benzoate; 2-(dimethylamino) ethylbenzoate; poly[oxy(methyl-1,2-ethanediyl)]; α-[4-(dimethylamino)-α-butoxy; butoxyethyl-4-(dimethylamino) benzoate; triethanolamine, N-methyldiethanolamine, N,N-dimethylethanolamine; plus EBECRYL 80/81/83, EBECRYL LEO 10551/10552/10553, EBECRYL 7100 and EBECRYL P116 available from Cytec; CN501, CN503, CN550, CN UVA421, CN341, CN3705, CN3715, CN3735, CN3755, CN381, CN384, CN584, and CN554 all available from Sartomer; GENOMER 5142, GENOMER 5161, and GENOMER 5275 from Rahn; PHOTOMER 4771, PHOTOMER 4779F, PHOTOMER 4967F, PHOTOMER 4968F, PHOTOMER 5006F, PHOTOMER 4775F, PHOTOMER 5960F, LAROMER LR8996, LAROMER PO 94F and LAROMER PO77F, all available from BASF; OMNIRAD CI-250 and OMNILANE A1230C from IGM Resins; and DESMOLUX VPLS 2299 from Bayer Coatings.

The ink formulation can optionally include a suitable de-aerator, which prevents the formation of air inclusions and pinholes in the cured coating. These also reduce rectified diffusion, which can cause reliability issues in the printhead. Examples include the following products available from Evonik: TEGO AIREX900, 910, 916, 920, 931, 936, 940, 944, 945, 950, 962, 980, and 986.

Defoamers can also optionally be included in the formulation, which prevent the formation of foam during manufacture of the ink, and also while jetting. These are particularly important with recirculating printheads. Examples of suitable defoamers include TEGO FOAMEX N, FOAMEX 1488, 1495, 3062, 7447, 800, 8030, 805, 8050, 810, 815N, 822, 825, 830, 831, 835, 840, 842, 843, 845, 855, 860, and 883, TEGO FOAMEX K3, TEGO FOAMEX K7/K8 and TEGO TWIN 4000, all available from Evonik. Available from Byk is BYK-066N, 088, 055, 057, 1790, and 020, BYK-A 530, and 067A, and BYK 354.

Surface control additives are often optionally used to control the surface tension of the ink, which is required to adjust the wetting on the face plate of the printhead, and also to give the desired drop spread on the substrate, or, in the case of multi pass inkjet printing, wet on dry drop spread. They can also be used to control the level of slip and scratch resistance of the coating. Examples of suitable surface control additives include but are not limited to TEGO FLOW300, 370, and 425, TEGO GLIDE 100, 110, 130, 406, 410, 411, 415, 420, 432, 435, 440, 482, A115, and B1484, TEGO GLIDE ZG 400, TEGO RAD2010, 2011, 2100, 2200N, 2250, 2300, 2500, 2600, 2650, and 2700, TEGO TWIN 4000, and 4100, TEGO WET 240, 250, 260, 265, 270, 280, 500, 505, and 510 and TEGO WET KL245, all available from Evonik. Available from Byk are BYK 333, and 337, BYK UV3500, BYK 378, 347, and 361, BYK UV3530, and 3570, CERAFLOUR 998, and 996, NANOBYK 3601, 3610, and 3650 and CERMAT 258. Available from Cytec are EBECRYL 350, and 1360, MODAFLOW 9200, and EBECRYL 341. From Sartomer, the aliphatic silicone acrylate CN9800 may be used.

The ink compositions of the present invention may optionally contain one or more colorants, including pigments and/or dyes. Examples of suitable organic or inorganic pigments include carbon black, zinc oxide, titanium dioxide, phthalocyanine, anthraquinones, perylenes, carbazoles, monoazo and disazobenzimidazoles, rhodamines, indigoids, quinacridones, diazopyranthrones, dinitroanilines, pyrazoles, diazopyranthrones, pyrazoles, dianisidines, pyranthrones, tetracholoroisoindolines, dioxazines, monoazoacrylides and anthrapyrimidines, combinations thereof, and the like. The dyes include but are not limited to azo dyes, anthraquinone dyes, xanthene dyes, azine dyes, combinations thereof and the like.

Commercial organic pigments classified according to Color Index International may be used, including, but not limited to, those according to the following trade designations: blue pigments PB1, PB15, PB15:1, PB15:2, PB15:3, PB15:4, PB15:6, PB16, PB60; brown pigments PB5, PB23, and PB265; green pigments PG1, PG7, PG10 and PG36; yellow pigments PY3, PY14, PY16, PY17, PY24, PY65, PY73, PY74 PY83, PY95, PY97, PY108, PY109, PY110, PY113, PY128, PY129, PY138, PY139, PY150, PY151, PY154, PY156, PY175, PY180 and PY213; orange pigments PO5, PO15, PO16, PO31, PO34, PO36, PO43, PO48, PO51, PO60, PO61 and PO71; red pigments PR4, PR5, PR7, PR9, PR22, PR23, PR48, PR48:2, PR49, PR112, PR122, PR123, PR149, PR166, PR168, PR170, PR177, PR179, PR190, PR202, PR206, PR207, PR224 and PR254: violet pigments PV19, PV23, PV32, PV37 and PV42; black pigments PBk1, PBk6, PBk7, PBk8, PBk9, PBk10, PBk11, PBk12, PBk13, PBk14, PBk17, PBk18, PBk19, PBk22, PBk23, PBk24, PBk25, PBk26, PBk27, PBk28, PBk29, PBk30, PBk31, PBk32, PBk33, PBk34, PBk35, NBk1, NBk2, NBk3, NBk4, NBk6; combinations thereof, and the like.

The pigments are preferably milled to typically less than 1 micrometer, with a preferred particle size distribution of 10-500 nm, and more preferably 10-350 nm, to have better transparency and a wide color gamut. The pigment dispersion will typically contain 60-90% monomer, which can be a mono or multifunctional (meth)acrylate monomer, with added stabilizer, inhibitor, dispersant and, optionally, a pigment additive/synergist and/or a wetting additive/oligomer/resin. The pigment dispersions may also be water-based pigment dispersions. The ratio of pigment to dispersant would usually be 1:2 to 9:1 depending on the chemistry of the pigment and dispersant. Typical dispersants would include EFKA 7414, 7476, 7477, 7700, 7701, 7702, 7710, 7731 and 7732 available from BASF and SOLSPERSE 1700, 1900, 24000SC/GR, 26000, 32000, 33000, 35000, 36000, 39000, 41000 and 71000 available from Lubrizol. Examples of additive/synergists to aid dispersion stability include SOLSPERSE 5000, 12000 and 22000 from Lubrizol.

The curing of the inks of the present invention normally requires a traditional mercury vapor discharge lamp to generate UV radiation for initiating the cure of energy curable inkjet inks. Solid state UV radiation sources such as UV light emitting diodes (LEDs) can also be used as the source of UV radiation. Mercury lamps also take time to heat up and cool down and have the potential to release mercury, which is highly toxic. UV LEDs can be rapidly switched on and off, are more energy efficient and don't generate heat, so are better for use with heat sensitive substrates. This is leading to a movement towards UV LED formulations, which can be more sensitive to issues with stray light as they contain photoinitiators with spectral absorbance in the UVA region of the electromagnetic spectrum. The inks of the present invention could also be formulated to cure by other radiation sources, such as, for example, microwave, infrared, electron beam, visible light, x-ray, etc.

EXAMPLES

The following examples illustrate specific aspects of the present invention and are not intended to limit the scope thereof in any respect and should not be so construed.

Example 1—Properties of Cyan Ink-Jet Inks Containing Acrylamide

Cyan inkjet inks were prepared according to the formulations in Table 1. All amounts are in wt % unless specified otherwise. Ink viscosity was recorded using a Brookfield DVII viscometer at 50° C.

TABLE 1

| | | Examples | | | | | |
|---|---|---|---|---|---|---|---|
| Material | Source/commercial code | Cyan 1A (comp) | Cyan 1B (comp) | Cyan 1C (inv) | Cyan 1D (inv) | Cyan 1E (inv) | Cyan 1F (comp) |
| N-vinyl caprolactam | BASF, V-CAP | 24.9 | | | | | |
| Diacetone acrylamide | Sigma-Aldrich | | | 24.9 | | | |
| N-isobutoxymethyl acrylamide | MRC-Unitec, IBMA | | | | 24.9 | | |
| N-isopropyl acrylamide | Sigma-Aldrich | | | | | 24.9 | |
| N-acryloyl morpholine | RAHN, ACMO | | | | | | 24.9 |
| Cyclic trimethylolpropane formal acrylate | Sartomer, SR531 | 18 | 26.3 | 18 | 18 | 18 | 18 |
| Isobornyl acrylate | Sartomer, SR506D | 12 | 20.3 | 12 | 12 | 12 | 12 |
| 2-Phenoxyethylacrylate | Sartomer, SR339EU | 16.25 | 24.55 | 16.25 | 16.25 | 16.25 | 16.25 |
| Photoinitiator | IGM, Omnirad TPO | 4.9 | 4.9 | 4.9 | 4.9 | 4.9 | 4.9 |
| Photoinitiator | BASF, Irgacure 184 | 2 | 2 | 2 | 2 | 2 | 2 |
| Photoinitiator | Lambson, DETX | 2 | 2 | 2 | 2 | 2 | 2 |
| Photoinitiator | BASF, Irgacure 819 | 2.6 | 2.6 | 2.6 | 2.6 | 2.6 | 2.6 |
| Slip additive | Evonik, Tegoglide 410 | 0.5 | 0.5 | 0.5 | 0.5 | 0.5 | 0.5 |
| Resin solution (in monomer) | Lucite, Elvacite 2013 | 6 | 6 | 6 | 6 | 6 | 6 |
| Stabilizer package | | 1.12 | 1.12 | 1.12 | 1.12 | 1.12 | 1.12 |
| Pigment concentrate containing 25% CI | | 9.73 | 9.73 | 9.73 | 9.73 | 9.73 | 9.73 |
| Pigment Blue 15:4 in cyclic trimethylolpropane formal acrylate | | | | | | | |
| Total | | 100 | 100 | 100 | 100 | 100 | 100 |
| Viscosity (mPas @ 50° C.) | | 9.15 | 10.0 | 15.7 | 13.5 | 11.8 | 11.0 |

Note:
"comp" = Comparative Example;
"inv" = Inventive Example

Cure Speed/Blocking Resistance

The inks in Table 1 were printed onto PE85 white Top Trans label substrate (from Avery Dennison) using a number 2 K bar and cured at doses of 50, 70 and 150 mJ under a medium pressure mercury arc lamp on a Primarc Maxicure UV rig. The prints were then stacked with a piece of blank Incada Excel carton board substrate (reverse side) on top and put under a pressure of 10 tons for 5 seconds in a Specac blocking tester. The cartonboard layer was removed and the level of ink blocking determined by amount of color transferred to the blank substrate using a Spectraflash 600 Spectrophotometer measuring the DL* value through a wide aperture. Lower levels of DL* indicate faster cure speed and better blocking performance due to lower ink transfer. Results are given in Table 2.

TABLE 2

| Example | DL* 50 mJ | DL* 70 mJ | DL* 150 mJ |
|---|---|---|---|
| Cyan 1A | 1.87 | 0.08 | 0.44 |
| Cyan 1B | 20.68 | 9.72 | 0.45 |
| Cyan 1C | 2.61 | 1.81 | 0.16 |
| Cyan 1D | 7.22 | 4.05 | 0.87 |
| Cyan 1E | 17.56 | 11.05 | 0.52 |
| Cyan 1F | 3.99 | 1.13 | 0.41 |

The results in Table 2 demonstrate that the inventive inks have varying degrees of block resistance, all of which could be satisfactory based on customer print processing and end-use requirements. The preferred diacetone acrylamide material (Example 1C), exhibits faster cure speed than the other acrylamides tested, including the well-known and widely used tertiary acrylamide ACMO, and has similar performance to N-vinylcaprolactam. The invention therefore shows excellent utility, particularly at the low cure doses which are increasingly important in the commercial environment. Example 1B contains no acrylamide or N-vinyl caprolactam and shows very poor cure performance at low doses. The inks of the invention performed comparably to prior art inks, showing that satisfactory inks can be formulated, without use of the currently used odiferous and toxic components. The inventive inks can be used instead of prior art inks, with or without minor modifications to curing conditions. In fact, inks containing diacetone acrylamide performed just as well as inks containing NVC, which is currently considered the best amide compound to use, and hereto was not considered replaceable.

Tack Free Cure

The inks in Table 1 were printed onto PE85 white Top Trans label substrate (from Avery Dennison) using a number 2 K bar and cured at doses of 70 mJ under a medium pressure mercury arc lamp on a Primarc Maxicure UV rig. The prints were then assessed for their surface tack by finger touch, both immediately and 1 hour after cure. Results are given in Table 3.

TABLE 3

| Example | Finger tack immediately after cure | Finger tack 1 hr. after cure |
|---|---|---|
| Cyan 1A | Not tacky | Not tacky |
| Cyan 1B | Very tacky | Very tacky |
| Cyan 1C | Not tacky | Not tacky |
| Cyan 1D | Tacky | Tacky |
| Cyan 1E | Tacky | Slightly tacky |
| Cyan 1F | Slightly tacky | Not tacky |

The results in Table 3 demonstrate that the inventive inks have varying degrees of cure, all of which could be satisfactory based on customer curing processing and end-use requirements. The preferred diacetone acrylamide material (Example 1C), has similar tack-free cure performance to N-vinyl caprolactam and shows much better performance than all the other acrylamides tested, including the well-known ACMO in Example 1F. The inks of the invention performed comparably to prior art inks, showing that satisfactory inks can be formulated, without use of the currently used odiferous and toxic components. The inventive inks can be used instead of prior art inks, with or without minor modifications to curing conditions. In fact, inks containing diacetone acrylamide performed just as well as inks containing NVC, which is currently considered the best amide compound to use, and hereto was not considered replaceable.

Stackability/Blocking

The Example inks 1A-F in Table 1 were printed onto a flexible white vinyl substrate using a 12 micron K bar and cured at a dose of 70 mJ under a medium pressure mercury arc lamp on a Primarc Maxicure UV rig. An additional piece of blank substrate was then placed face down onto the print surface and the print sandwich placed under a 2 kg weight for 6 hours. The 2 pieces of substrate were then peeled apart and the level of adhesion and ink transfer to the blank substrate assessed. The results are shown in Table 4, using the following criteria:

FAIL—The blank substrate sticks to the printed ink; and/or makes a distinct audible "crackling" noise as the sheets are separated; and/or ink transfer occurs to the top blank piece of substrate.

PASS—There is slight or no adherence between the blank substrate and the printed ink; little or no noise on separation of the sheets; little or no ink is transferred to the top blank piece of substrate; and very little or no effort is required to separate the sheets.

TABLE 4

| Example | Stackability/Blocking |
|---|---|
| Cyan 1A | PASS |
| Cyan 1B | FAIL |
| Cyan 1C | PASS |
| Cyan 1D | FAIL |
| Cyan 1E | FAIL |
| Cyan 1F | PASS |

The results in Table 4 demonstrate that the inventive inks have varying degrees of blocking, all of which could be satisfactory based on customer curing processing and end-use requirements. The preferred diacetone acrylamide material (Example 1C) shows good utility and gives acceptable performance in this stackabilily/blocking test. The inks of the invention performed comparably to prior art inks, showing that satisfactory inks can be formulated, without use of the currently used odiferous and toxic components. The inventive inks can be used instead of prior art inks, with or without minor modifications to curing conditions. In fact, inks containing diacetone acrylamide performed just as well as inks containing NVC, which is currently considered the best amide compound to use, and hereto was not considered replaceable.

Adhesion

The inks in Table 1 were printed onto Dibond, polycarbonate, acrylic, rigid polystyrene, rigid vinyl and flexible vinyl substrates using a 12 micron K bar and cured at a dose of 150 mJ under a medium pressure mercury arc lamp on a Primarc Maxicure UV rig. Their adhesion to the test substrates was then tested with the well-known cross hatch adhesion test (ISO 2409) using a scalpel and ISO 2409 adhesive tape from Elcometer. Results are given in numerical categories according to the amount of ink removed from zero (perfect, no ink removed) to 5 (>35% ink removed). These results are given in Table 5.

Examples 2, 3, 4—Cure Enhancement of Ink-Jet Inks Containing Diacetone Acrylamide Cyan inkjet inks were prepared according to the formulations in Table 6. The formulations in Table 6 were prepared for each of 3 different acrylamides:

diacetone acrylamide; giving formulations 2 A-E

N-isopropyl acrylamide; giving formulations 3 A-E*

N-isobutoxymethyl acrylamide; giving formulations 4 A-E

*Note that N-isopropyl acrylamide was not soluble at 30% in the test formulation and so was not measured at that concentration.

TABLE 6

| Material | Source/ commercial code | Cyan A | Cyan B | Cyan C | Cyan D | Cyan E |
|---|---|---|---|---|---|---|
| Acrylamide | | 0 | 5 | 10 | 20 | 30 |
| Cyclic trimethylolpropane formal acrylate | Sartomer, SR531 | 23.72 | 22.05 | 20.39 | 17.05 | 13.72 |
| Isobornyl acrylate | Sartomer, SR506D | 23.72 | 22.05 | 20.39 | 17.05 | 13.72 |
| 2-Phenoxyethylacrylate | Sartomer, SR339EU | 23.71 | 22.05 | 20.37 | 17.05 | 13.71 |
| Photoinitiator | IGM, Omnirad TPO | 4.9 | 4.9 | 4.9 | 4.9 | 4.9 |
| Photoinitiator | BASF, Irgacure 184 | 2 | 2 | 2 | 2 | 2 |
| Photoinitiator | Lambson, DETX | 2 | 2 | 2 | 2 | 2 |
| Photoinitiator | BASF, Irgacure 819 | 2.6 | 2.6 | 2.6 | 2.6 | 2.6 |
| Slip additive | Evonik, Tegoglide 410 | 0.5 | 0.5 | 0.5 | 0.5 | 0.5 |
| Resin solution (in monomer) | Lucite, Elvacite 2013 | 6 | 6 | 6 | 6 | 6 |
| Stabilizer package | | 1.12 | 1.12 | 1.12 | 1.12 | 1.12 |
| Pigment concentrate containing | | 9.73 | 9.73 | 9.73 | 9.73 | 9.73 |
| 25% CI Pigment Blue 15:4 in cyclic trimethylolpropane formal acrylate | | | | | | |
| Total | | 100 | 100 | 100 | 100 | 100 |

TABLE 5

Crosshatch adhesion test results

| Example | Dibond | Poly-carbonate | Acrylic | Rigid Polystyrene | Rigid PVC | Flexible vinyl |
|---|---|---|---|---|---|---|
| Cyan 1A | 0 | 0 | 2 | 0 | 0 | 1 |
| Cyan 1B | 5 | 0 | 0 | 0 | 0 | 1 |
| Cyan 1C | 1 | 0 | 0 | 0 | 1 | 1 |
| Cyan 1D | 1 | 0 | 0 | 0 | 1 | 1 |
| Cyan 1E | 1 | 0 | 1 | 0 | 0 | 2 |
| Cyan 1F | 1 | 0 | 2 | 2 | 3 | 1 |

The results in Table 5 demonstrate that the inventive inks have varying degrees of adhesion, all of which could be satisfactory based on customer curing processing and end-use requirements. Further, the preferred diacetone acrylamide material (Example 1C) can be used in ink-jet formulations without any significant loss of adhesion against a typical standard commercial ink containing NVC. It should also be noted that Example 1C also has superior performance to the well-known and widely used ACMO.

Cure Speed/Blocking Resistance

Figure 2:
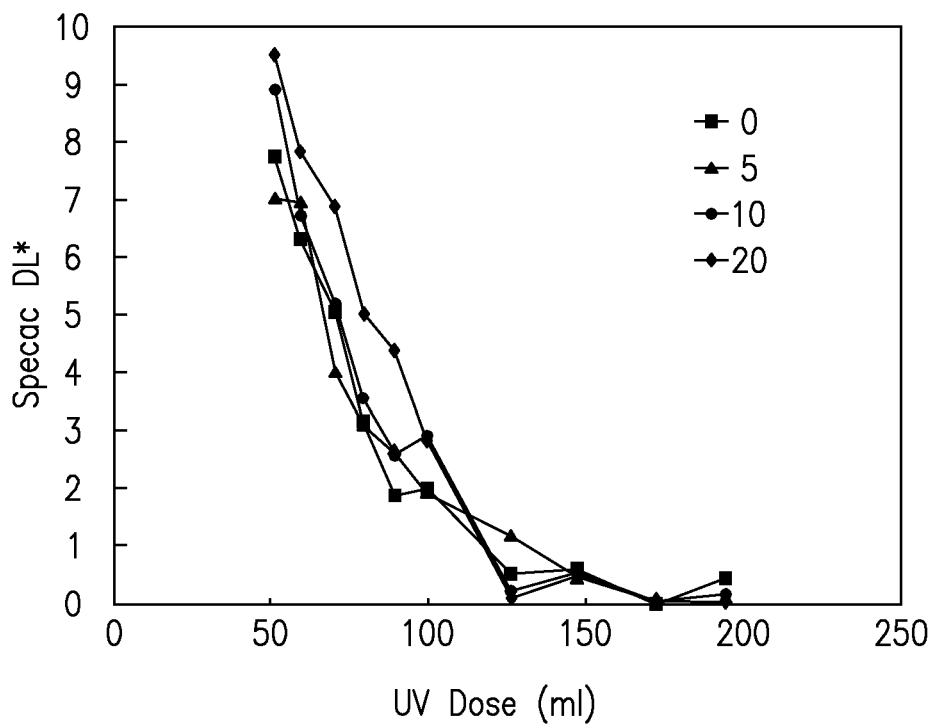
FIG. 2: Shows the effect of increasing concentrations of N-isopropyl acrylamide (0-20%) on the effective radiation cure dose for inks 3A-3D.
Figure 3:
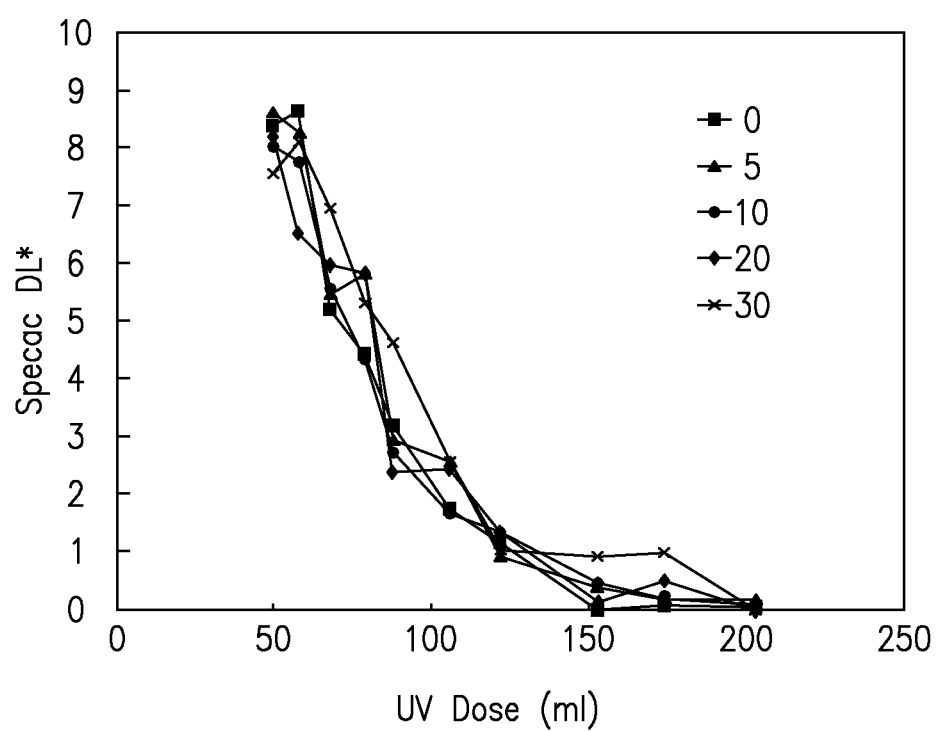
FIG. 3: Shows the effect of increasing concentrations of N-isobutoxymethyl acrylamide (0-30%) on the effective cure dose for inks 4A-4E.

The inks in Table 6 were printed onto PE85 white Top Trans label substrate (from Avery Dennison) using a number 2 K bar and cured at a series of defined doses between 33-204 mJ under a medium pressure mercury arc lamp on a Primarc Maxicure UV rig. The prints were then stacked with a piece of blank Incada Excel carton board substrate (reverse side) on top and put under a pressure of 10 tons for 5 seconds in a Specac blocking tester. The cartonboard layer was removed and the level of ink blocking determined by amount of color transferred to the blank substrate using a Spectraflash 600 Spectrophotometer measuring the DL* value through a wide aperture. Lower levels of DL* indicate higher cure speed and better blocking performance due to lower ink transfer. Results are given in FIGS. 1-3 where it is clear that increasing levels of diacetone acrylamide (FIG. 1) give rise to an incremental improvement in cure performance, as shown by decreasing DL* values. In contrast, both N-isopropyl acrylamide (FIG. 2) and N-isobutoxymethyl acrylamide (FIG. 3) show no such advantageous increase in cure speed with increasing concentration. The inks of the invention performed comparably to prior art inks, showing that satisfactory inks can be formulated, without use of the currently used odiferous and toxic components. The inventive inks can be used instead of prior art inks, with or without minor modifications to curing conditions.

Example 5—Properties of Yellow Ink-Jet Inks Containing Acrylamide

Yellow inkjet inks were prepared according to the formulations in Table 7. All amounts are in wt % unless specified otherwise. Ink viscosity was recorded using a Brookfield DVII viscometer at 50° C.

minor modifications to curing conditions. In fact, inks containing diacetone acrylamide performed just as well as inks containing NVC, which is currently considered the best amide compound to use, and hereto was not considered replaceable.

Stackability/Blocking

The yellow inks A-D in Table 7 were printed onto a flexible white vinyl substrate using a 12 micron K bar and cured at a dose of 70 mJ under a medium pressure mercury arc lamp on a Primarc Maxicure UV rig. An additional piece of blank substrate was then placed face down onto the print surface and the print sandwich placed under a 2 kg weight for 6 hours. The two pieces of substrate were then peeled

TABLE 7

| Material | Source/commercial code | Yellow 5A (comp) | Yellow 5B (comp) | Yellow 5C (inv) | Yellow 5D (inv) |
|---|---|---|---|---|---|
| N-vinyl caprolactam | BASF, V-CAP | 24.9 | | | |
| Diacetone acrylamide | Sigma-Aldrich | | | 24.9 | |
| N-isobutoxymethyl acrylamide | MRC-Unitec, IBMA | | | | 24.9 |
| Cyclic trimethylolpropane formal acrylate | Sartomer, SR531 | 18 | 26.3 | 18 | 18 |
| Isobornyl acrylate | Sartomer, SR506D | 9 | 17.3 | 9 | 9 |
| 2-Phenoxyethylacrylate | Sartomer, SR339EU | 17.5 | 25.8 | 17.5 | 17.5 |
| Photoinitiator | IGM, Omnirad TPO | 4.9 | 4.9 | 4.9 | 4.9 |
| Photoinitiator | BASF, Irgacure 184 | 2 | 2 | 2 | 2 |
| Photoinitiator | Lambson, DETX | 2 | 2 | 2 | 2 |
| Photoinitiator | BASF, Irgacure 819 | 2.6 | 2.6 | 2.6 | 2.6 |
| Slip additive | Evonik, Tegoglide 410 | 0.5 | 0.5 | 0.5 | 0.5 |
| Resin solution (in monomer) | Lucite, Elvacite 2013 | 7 | 7 | 7 | 7 |
| Stabilizer package | | 1.2 | 1.2 | 1.2 | 1.2 |
| Pigment concentrate containing 16% CI Pigment Yellow 150 in cyclic trimethylolpropane formal acrylate | | 10.4 | 10.4 | 10.4 | 10.4 |
| Total | | 100 | 100 | 100 | 100 |
| Viscosity (mPas @ 50° C.) | | 9.96 | 11.1 | 17.5 | 15.1 |

Tack Free Cure

The inks in Table 7 were printed onto PE85 white Top Trans label substrate (from Avery Dennison) using a number 2 K bar and cured at doses of 70 mJ under a medium pressure mercury arc lamp on a Primarc Maxicure UV rig. The prints were then assessed for their surface tack by finger touch, both immediately and 1 hour after cure. Results are given in Table 8.

TABLE 8

| Example | Finger tack immediately after cure | Finger tack 1 hour after cure |
|---|---|---|
| Yellow 5A | Not tacky | Not tacky |
| Yellow 5B | Tacky | Slightly tacky |
| Yellow 5C | Slightly tacky | Not tacky |
| Yellow 5D | Tacky | Slightly tacky |

The results in Table 8 demonstrate that the inventive inks have varying degrees of cure, all of which could be satisfactory based on customer curing processing and end-use requirements. The preferred diacetone acrylamide material (Example 5C) has similar tack-free cure performance to N-vinyl caprolactam and shows much better performance than N-isobutoxymethyl acrylamide. The inks of the invention performed comparably to prior art inks, showing that satisfactory inks can be formulated, without use of the currently used odiferous and toxic components. The inventive inks can be used instead of prior art inks, with or without apart and the level of adhesion and ink transfer to the blank substrate assessed. The results are shown in Table 9 using the following criteria:

FAIL—The blank substrate sticks to the printed ink; and/or makes a distinct audible "crackling" noise as the sheets are separated; and/or ink transfer occurs to the top blank piece of substrate.

PASS—There is slight or no adherence between the blank substrate and the printed ink; little or no noise on separation of the sheets; little or no ink is transferred to the top blank piece of substrate; and very little or no effort is required to separate the sheets.

TABLE 9

| Example | Stackability/Blocking |
|---|---|
| Yellow 5A | PASS |
| Yellow 5B | FAIL |
| Yellow 5C | PASS |
| Yellow 5D | FAIL |

The results in Table 9 demonstrate that the inventive inks have varying degrees of blocking, all of which could be satisfactory based on customer curing processing and end-use requirements. The preferred diacetone acrylamide material (Example 5C) shows good utility and gives acceptable performance in yellow inks for this stackability/blocking test. The inks of the invention performed comparably to prior art inks, showing that satisfactory inks can be formulated, without use of the currently used odiferous and toxic components. The inventive inks can be used instead of prior art inks, with or without minor modifications to curing conditions. In fact, inks containing diacetone acrylamide performed just as well as inks containing NVC, which is currently considered the best amide compound to use, and hereto was not considered replaceable.

Example 6—Properties of Magenta Ink-Jet Inks Containing Acrylamide

Magenta inkjet inks were prepared according to the formulations in Table 10. All amounts are in wt % unless specified otherwise. Ink viscosity was recorded using a Brookfield DVII viscometer at 50° C.

currently used odiferous and toxic components. The inventive inks can be used instead of prior art inks, with or without minor modifications to curing conditions. In fact, inks containing diacetone acrylamide performed just as well as inks containing NVC, which is currently considered the best amide compound to use, and hereto was not considered replaceable.

Stackability/Blocking

The magenta inks A-D in Table 10 were printed onto a flexible white vinyl substrate using a 12 micron K bar and cured at a dose of 70 mJ under a medium pressure mercury arc lamp on a Primarc Maxicure UV rig. An additional piece of blank substrate was then placed face down onto the print surface and the print sandwich placed under a 2 kg weight for 6 hours. The 2 pieces of substrate were then peeled apart

TABLE 10

| Material | Source/commercial code | Magenta 6A (comp) | Magenta 6B (comp) | Magenta 6C (inv) | Magenta 6D (inv) |
| --- | --- | --- | --- | --- | --- |
| N-vinyl caprolactam | BASF, V-CAP | 24.9 | | | |
| Diacetone acrylamide | Sigma-Aldrich | | | 24.9 | |
| N-isobutoxymethyl acrylamide | MRC-Unitec, IBMA | | | | 24.9 |
| Cyclic trimethylolpropane formal acrylate | Sartomer, SR531 | 25.2 | 33.5 | 25.2 | 25.2 |
| Isobornyl acrylate | Sartomer, SR506D | 12 | 20.3 | 12 | 12 |
| 2-Phenoxyethylacrylate | Sartomer, SR339EU | 5.7 | 14 | 5.7 | 5.7 |
| Photoinitiator | IGM, Omnirad TPO | 4.9 | 4.9 | 4.9 | 4.9 |
| Photoinitiator | BASF, Irgacure 184 | 2 | 2 | 2 | 2 |
| Photoinitiator | Lambson, DETX | 2 | 2 | 2 | 2 |
| Photoinitiator | BASF, Irgacure 819 | 2.6 | 2.6 | 2.6 | 2.6 |
| Slip additive | Evonik, Tegoglide 410 | 0.5 | 0.5 | 0.5 | 0.5 |
| Resin solution (in monomer) | Lucite, Elvacite 2013 | 4 | 4 | 4 | 4 |
| Stabilizer package | | 1.2 | 1.2 | 1.2 | 1.2 |
| Pigment concentrate containing 21% CI Pigment Violet 19 in 2-Phenoxyethylacrylate | | 15 | 15 | 15 | 15 |
| Total | | 100 | 100 | 100 | 100 |
| Viscosity (mPas @ 50° C.) | | 9.15 | 10.0 | 15.1 | 12.7 |

Tack Free Cure

The magenta inks in Table 10 were printed onto PE85 white Top Trans label substrate (from Avery Dennison) using a number 2 K bar and cured at doses of 70 mJ under a medium pressure mercury arc lamp on a Primarc Maxicure UV rig. The prints were then assessed for their surface tack by finger touch, both immediately and 1 hour after cure. Results are given in table 11.

TABLE 11

| Example | Finger tack immediately after cure | Finger tack 1 hour after cure |
| --- | --- | --- |
| Magenta 6A | Slightly tacky | Not tacky |
| Magenta 6B | Tacky | Slightly tacky |
| Magenta 6C | Slightly tacky | Not tacky |
| Magenta 6D | Tacky | Slightly tacky |

The results in Table 11 demonstrate that the inventive inks have varying degrees of cure, all of which could be satisfactory based on customer curing processing and end-use requirements. The preferred diacetone acrylamide material (Example 6C) has similar tack-free cure performance to N-vinyl caprolactam and shows much better performance than N-isobutoxymethyl acrylamide. The inks of the invention performed comparably to prior art inks, showing that satisfactory inks can be formulated, without use of the and the level of adhesion and ink transfer to the blank substrate assessed. The results are shown in Table 12 using the following criteria:

FAIL—The blank substrate sticks to the printed ink; and/or makes a distinct audible "crackling" noise as the sheets are separated; and/or ink transfer occurs to the top blank piece of substrate.

PASS—There is slight or no adherence between the blank substrate and the printed ink; little or no noise on separation of the sheets; little or no ink is transferred to the top blank piece of substrate; and very little or no effort is required to separate the sheets.

TABLE 12

| Example | Stackability/Blocking |
| --- | --- |
| Magenta 6A | PASS |
| Magenta 6B | FAIL |
| Magenta 6C | PASS |
| Magenta 6D | FAIL |

The results in Table 12 demonstrate that the inventive inks have varying degrees of blocking, all of which could be satisfactory based on customer curing processing and end-use requirements. The preferred diacetone acrylamide material (Example 6C) shows good utility in magenta inks and gives acceptable performance in this stackability/blocking test. The inks of the invention performed comparably to prior art inks, showing that satisfactory inks can be formulated, without use of the currently used odiferous and toxic components. The inventive inks can be used instead of prior art inks, with or without minor modifications to curing conditions. In fact, inks containing diacetone acrylamide performed just as well as inks containing NVC, which is currently considered the best amide compound to use, and hereto was not considered replaceable.

Example 7—Properties of Black Ink-Jet Inks Containing Acrylamide

Black inkjet inks were prepared according to the formulations in Table 13. All amounts are in wt % unless specified otherwise. Ink viscosity was recorded using a Brookfield DVII viscometer at 50° C.

N-vinyl caprolactam. The inks of the invention performed comparably to prior art inks, showing that satisfactory inks can be formulated, without use of the currently used odiferous and toxic components. The inventive inks can be used instead of prior art inks, with or without minor modifications to curing conditions. In fact, inks containing diacetone acrylamide performed just as well as inks containing NVC, which is currently considered the best amide compound to use, and hereto was not considered replaceable.

Stackability/Blocking

The black inks 7A-D in table 13 were printed onto a flexible white vinyl substrate using an 8 micron K bar and cured at a dose of 150 mJ under a medium pressure mercury arc lamp on a Primarc Maxicure UV rig. An additional piece of blank substrate was then placed face down onto the print surface and the print sandwich placed under a 2 kg weight for 6 hours. The 2 pieces of substrate were then peeled apart

TABLE 13

| | | Examples | | | |
| --- | --- | --- | --- | --- | --- |
| Material | Source/commercial code | Black 7A (comp) | Black 7B (comp) | Black 7C (inv) | Black 7D (inv) |
| N-vinyl caprolactam | BASF, V-CAP | 20 | | | |
| Diacetone acrylamide | Sigma-Aldrich | | | 20 | |
| N-isobutoxymethyl acrylamide | MRC-Unitec, IBMA | | | | 20 |
| Dipentaerythritol hexaacrylate | Sartomer, SR399 | 1 | 1 | 1 | 1 |
| 2-Phenoxyethylacrylate | Sartomer, SR339EU | 55.34 | 75.34 | 55.34 | 55.34 |
| Photoinitiator | IGM, Omnirad TPO | 4.9 | 4.9 | 4.9 | 4.9 |
| Photoinitiator | BASF, Irgacure 369 | 1 | 1 | 1 | 1 |
| Photoinitiator | Lambson, DETX | 2 | 2 | 2 | 2 |
| Photoinitiator | BASF, Irgacure 819 | 2.6 | 2.6 | 2.6 | 2.6 |
| Slip additive | Evonik, Tegoglide 410 | 0.5 | 0.5 | 0.5 | 0.5 |
| Stabilizer package | | 1.12 | 1.12 | 1.12 | 1.12 |
| Pigment concentrate containing | | 11.54 | 11.54 | 11.54 | 11.54 |
| 22.5% CI Pigment Black 7 in cyclic trimethylolpropane formal acrylate | | | | | |
| Total | | 100 | 100 | 100 | 100 |
| Viscosity (mPas @ 50° C.) | | 9.24 | 9.63 | 13.6 | 12.3 |

Tack Free Cure

The black inks in Table 13 were printed onto PE85 white Top Trans label substrate (from Avery Dennison) using an 8 microns K bar and cured at doses of 150 mJ under a medium pressure mercury arc lamp on a Primarc Maxicure UV rig. The prints were then assessed for their surface tack by finger touch, both immediately and 1 hour after cure. Results are given in Table 14.

TABLE 14

| Example | Finger tack immediately after cure | Finger tack 1 hour after cure |
| --- | --- | --- |
| Black 7A | Not tacky | Not tacky |
| Black 7B | Very tacky | Tacky |
| Black 7C | Slightly tacky | Not tacky |
| Black 7D | Slightly tacky | Slight tacky |

The results in Table 14 demonstrate that the inventive inks have varying degrees of cure, all of which could be satisfactory based on customer curing processing and end-use requirements. The preferred diacetone acrylamide material (Example 7C) has similar tack-free cure performance to and the level of adhesion and ink transfer to the blank substrate assessed. The results are shown in Table 15 using the following criteria:

FAIL—The blank substrate sticks to the printed ink; and/or makes a distinct audible "crackling" noise as the sheets are separated; and/or ink transfer occurs to the top blank piece of substrate.

PASS—There is slight or no adherence between the blank substrate and the printed ink; little or no noise on separation of the sheets; little or no ink is transferred to the top blank piece of substrate; and very little or no effort is required to separate the sheets.

TABLE 15

| Example | Stackability/Blocking |
| --- | --- |
| Black 7A | PASS |
| Black 7B | PASS |
| Black 7C | PASS |
| Black 7D | PASS |

The results in Table 15 demonstrate good utility and acceptable performance for all 4 black inks for this stackability/blocking test.

Example 8—Properties of Cyan Ink-Let Inks Containing NVC and Hydroxypivalyl Hydroxypivalate Diacrylate Multifunctional Monomer Cyan inkjet inks were prepared according to the formulations in Table 16. All amounts are in wt % unless specified otherwise. Ink viscosity was recorded using a Brookfield DVII viscometer at 50° C.

TABLE 16

| Material | Source/commercial code | Cyan 8A (comp) | Cyan 8B (comp) | Cyan 8C (comp) | Cyan 8D (comp) | Cyan 8E (comp) | Cyan 8F (comp) | Cyan 8G (comp) | Cyan 8H (comp) | Cyan 8I (comp) |
|---|---|---|---|---|---|---|---|---|---|---|
| N-vinyl caprolactam | BASF, V-CAP | 24.9 | 24.9 | 24.9 | 24.9 | 24.9 | 24.9 | 24.9 | 24.9 | 24.9 |
| hydroxypivalyl hydroxypivalate diacrylate | Miwon, Miramer M210 | 0 | 1 | 2 | 4 | 6 | 8 | 10 | 12 | 15 |
| Cyclic trimethylolpropane formal acrylate | Sartomer, SR531 | 18 | 17 | 16 | 14 | 12 | 10 | 8 | 6 | 3 |
| Isobornyl acrylate | Sartomer, SR506D | 12 | 12 | 12 | 12 | 12 | 12 | 12 | 12 | 12 |
| 2-Phenoxyethylacrylate | Sartomer, SR339EU | 16.25 | 16.25 | 16.25 | 16.25 | 16.25 | 16.25 | 16.25 | 16.25 | 16.25 |
| Photoinitiator | IGM, Omnirad TPO | 4.9 | 4.9 | 4.9 | 4.9 | 4.9 | 4.9 | 4.9 | 4.9 | 4.9 |
| Photoinitiator | BASF, Irgacure 184 | 2 | 2 | 2 | 2 | 2 | 2 | 2 | 2 | 2 |
| Photoinitiator | Lambson, DETX | 2 | 2 | 2 | 2 | 2 | 2 | 2 | 2 | 2 |
| Photoinitiator | BASF, Irgacure 819 | 2.6 | 2.6 | 2.6 | 2.6 | 2.6 | 2.6 | 2.6 | 2.6 | 2.6 |
| Slip additive | Evonik, Tegoglide 410 | 0.5 | 0.5 | 0.5 | 0.5 | 0.5 | 0.5 | 0.5 | 0.5 | 0.5 |
| Resin solution (in monomer) | Lucite, Elvacite 2013 | 6 | 6 | 6 | 6 | 6 | 6 | 6 | 6 | 6 |
| Stabilizer package | | 1.12 | 1.12 | 1.12 | 1.12 | 1.12 | 1.12 | 1.12 | 1.12 | 1.12 |
| Pigment concentrate | | 9.73 | 9.73 | 9.73 | 9.73 | 9.73 | 9.73 | 9.73 | 9.73 | 9.73 |
| containing 25% CI Pigment Blue 15:4 in cyclic trimethylolpropane formal acrylate | | | | | | | | | | |
| Total | | 100 | 100 | 100 | 100 | 100 | 100 | 100 | 100 | 100 |
| Viscosity (mPas @ 50° C.) | | 9.00 | 8.40 | 9.15 | 9.03 | 8.58 | 9.12 | 9.66 | 9.18 | 9.72 |

Adhesion

The inks in Table 16 were printed onto Dibond, polycarbonate, and acrylic substrates using a 12 micron K bar and cured at a dose of 150 mJ under a medium pressure mercury arc lamp on a Primarc Maxicure UV rig. Their adhesion to the test substrates was then tested with the well-known cross hatch adhesion test (ISO 2409) using a scalpel and ISO 2409 adhesive tape from Elcometer. Results are given in numerical categories according to the amount of ink removed from zero (perfect, no ink removed) to 5 (>35% ink removed). Inks where all the ink is removed and there is no adhesion at all are also recorded. These results are given in Table 17.

TABLE 17

| | Crosshatch adhesion test results | | |
|---|---|---|---|
| Example | Dibond | Polycarbonate | Acrylic |
| Cyan 8A | 2 | 0 | 0 |
| Cyan 8B | 3 | 0 | 0 |
| Cyan 8C | 5 | 0 | 0 |
| Cyan 8D | No adhesion | 1 | 1 |
| Cyan 8E | No adhesion | 1 | 1 |
| Cyan 8F | No adhesion | 5 | 2 |
| Cyan 8G | No adhesion | No adhesion | 5 |
| Cyan 8H | No adhesion | No adhesion | No adhesion |
| Cyan 8I | No adhesion | No adhesion | No adhesion |

The results in Table 17 demonstrate that for monofunctional style inks containing N-vinyl caprolactam, increasing levels of the difunctional monomer hydroxypivalyl hydroxypivalate diacrylate leads to worsening adhesion when incorporated at levels of between 1-10% depending on the substrate, and total adhesion loss above 10%. The adhesion loss is associated with the increased shrinkage that comes from the use of multifunctional monomers.

Example 9—Properties of Cyan Ink-Jet Inks Containing NVC and 1,6-Hexanediol Diacrylate Multifunctional Monomer Cyan inkjet inks were prepared according to the formulations in Table 18. All amounts are in wt % unless specified otherwise. Ink viscosity was recorded using a Brookfield DVII viscometer at 50° C.

TABLE 18

| Material | Source/commercial code | Cyan 9A (comp) | Cyan 9B (comp) | Cyan 9C (comp) | Cyan 9D (comp) |
|---|---|---|---|---|---|
| N-vinyl caprolactam | BASF, V-CAP | 24.9 | 24.9 | 24.9 | 24.9 |
| 1,6-hexanediol diacrylate | Allnex, HDDA | 0 | 1 | 2 | 4 |
| Cyclic trimethylolpropane formal acrylate | Sartomer, SR531 | 18 | 17 | 16 | 14 |
| Isobornyl acrylate | Sartomer, SR506D | 12 | 12 | 12 | 12 |
| 2-Phenoxyethylacrylate | Sartomer, SR339EU | 16.25 | 16.25 | 16.25 | 16.25 |
| Photoinitiator | IGM, Omnirad TPO | 4.9 | 4.9 | 4.9 | 4.9 |
| Photoinitiator | BASF, Irgacure 184 | 2 | 2 | 2 | 2 |
| Photoinitiator | Lambson, DETX | 2 | 2 | 2 | 2 |
| Photoinitiator | BASF, Irgacure 819 | 2.6 | 2.6 | 2.6 | 2.6 |
| Slip additive | Evonik, Tegoglide 410 | 0.5 | 0.5 | 0.5 | 0.5 |
| Resin solution (in monomer) | Lucite, Elvacite 2013 | 6 | 6 | 6 | 6 |
| Stabilizer package | | 1.12 | 1.12 | 1.12 | 1.12 |
| Pigment concentrate containing 25% CI Pigment Blue 15:4 in cyclic trimethylolpropane formal acrylate | | 9.73 | 9.73 | 9.73 | 9.73 |
| Total | | 100 | 100 | 100 | 100 |
| Viscosity (mPas @ 50° C.) | | 9.00 | 9.33 | 9.36 | 9.00 |

Adhesion

The inks in Table 18 were printed onto Dibond, polycarbonate, and acrylic substrates using a 12 micron K bar and cured at a dose of 150 mJ under a medium pressure mercury arc lamp on a Primarc Maxicure UV rig. Their adhesion to the test substrates was then tested with the well-known cross hatch adhesion test (ISO 2409) using a scalpel and ISO 2409 adhesive tape from Elcometer. Results are given in numerical categories according to the amount of ink removed from zero (perfect, no ink removed) to 5 (>35% ink removed). Inks where all the ink is removed and there is no adhesion at all are also recorded. These results are given in Table 19.

TABLE 19

| | Crosshatch adhesion test results | | |
|---|---|---|---|
| Example | Dibond | Polycarbonate | Acrylic |
| Cyan 9A | 2 | 0 | 0 |
| Cyan 9B | 5 | 0 | 0 |
| Cyan 9C | No adhesion | 1 | 1 |
| Cyan 9D | No adhesion | 5 | 4 |

The results in Table 19 demonstrate that for monofunctional style inks containing N-vinyl caprolactam, increasing levels of the difunctional monomer 1,6-hexanediol diacrylate resulted in worsening adhesion when incorporated at levels of between 1 and 4%. The adhesion loss is associated with the increased shrinkage that comes from the use of multifunctional monomers.

Example 10—Properties of Cyan Ink-Jet Inks Containing Diacetone Acrylamide and Hydroxypivalyl Hydroxypivalate Diacrylate Multifunctional Monomer Cyan inkjet inks were prepared according to the formulations in Table 20.

TABLE 20

| Material | Source/commercial code | Cyan 10 A | Cyan 10 B | Cyan 10 C | Cyan 10 D | Cyan 10 E | Cyan 10 F | Cyan 10 G | Cyan 10 H | Cyan 10 I |
|---|---|---|---|---|---|---|---|---|---|---|
| Diacetone acrylamide | Sigma-Aldrich | 24.9 | 24.9 | 24.9 | 24.9 | 24.9 | 24.9 | 24.9 | 24.9 | 24.9 |
| hydroxypivalyl hydroxypivalate diacrylate | Miwon, Miramer M210 | 0 | 1 | 2 | 4 | 6 | 8 | 10 | 12 | 15 |
| Cyclic trimethylolpropane formal acrylate | Sartomer, SR531 | 18 | 17 | 16 | 14 | 12 | 10 | 8 | 6 | 3 |
| Isobornyl acrylate | Sartomer, SR506D | 12 | 12 | 12 | 12 | 12 | 12 | 12 | 12 | 12 |
| 2-Phenoxyethylacrylate | Sartomer, SR339EU | 16.25 | 16.25 | 16.25 | 16.25 | 16.25 | 16.25 | 16.25 | 16.25 | 16.25 |
| Photoinitiator | IGM, Omnirad TPO | 4.9 | 4.9 | 4.9 | 4.9 | 4.9 | 4.9 | 4.9 | 4.9 | 4.9 |
| Photoinitiator | BASF, Irgacure 184 | 2 | 2 | 2 | 2 | 2 | 2 | 2 | 2 | 2 |
| Photoinitiator | Lambson, DETX | 2 | 2 | 2 | 2 | 2 | 2 | 2 | 2 | 2 |

TABLE 20-continued

|  |  | Examples | | | | | | | | |
|---|---|---|---|---|---|---|---|---|---|---|
| Material | Source/commercial code | Cyan 10 A | Cyan 10 B | Cyan 10 C | Cyan 10 D | Cyan 10 E | Cyan 10 F | Cyan 10 G | Cyan 10 H | Cyan 10 I |
| Photoinitiator | BASF, Irgacure 819 | 2.6 | 2.6 | 2.6 | 2.6 | 2.6 | 2.6 | 2.6 | 2.6 | 2.6 |
| Slip additive | Evonik, Tegoglide 410 | 0.5 | 0.5 | 0.5 | 0.5 | 0.5 | 0.5 | 0.5 | 0.5 | 0.5 |
| Resin solution (in monomer) | Lucite, Elvacite 2013 | 6 | 6 | 6 | 6 | 6 | 6 | 6 | 6 | 6 |
| Stabilizer package |  | 1.12 | 1.12 | 1.12 | 1.12 | 1.12 | 1.12 | 1.12 | 1.12 | 1.12 |
| Pigment concentrate containing 25% CI Pigment Blue 15:4 in cyclic trimethylolpropane formal acrylate |  | 9.73 | 9.73 | 9.73 | 9.73 | 9.73 | 9.73 | 9.73 | 9.73 | 9.73 |
| Total |  | 100 | 100 | 100 | 100 | 100 | 100 | 100 | 100 | 100 |

Adhesion

The inks in Table 20 were printed onto Dibond, polycarbonate, and acrylic substrates using a 12 micron K bar and cured at a dose of 150 mJ under a medium pressure mercury arc lamp on a Primarc Maxicure UV rig. Their adhesion to the test substrates was then tested with the well-known cross hatch adhesion test (ISO 2409) using a scalpel and ISO 2409 adhesive tape from Elcometer. Results are given in numerical categories according to the amount of ink removed from zero (perfect, no ink removed) to 5 (>35% ink removed). Inks where all the ink is removed and there is no adhesion at all are also recorded. These results are given in Table 21.

TABLE 21

| Crosshatch adhesion test results | | | |
|---|---|---|---|
| Example | Dibond | Polycarbonate | Acrylic |
| Cyan 10 A | 2 | 0 | 0 |
| Cyan 10 B | 5 | 1 | 1 |
| Cyan 10 C | 4 | 1 | 0 |
| Cyan 10 D | 4 | 1 | 0 |
| Cyan 10 E | No adhesion | 4 | 1 |
| Cyan 10 F | No adhesion | No adhesion | 2 |
| Cyan 10 G | No adhesion | No adhesion | 4 |
| Cyan 10 H | No adhesion | No adhesion | No adhesion |

TABLE 21-continued

| Crosshatch adhesion test results | | | |
|---|---|---|---|
| Example | Dibond | Polycarbonate | Acrylic |
| Cyan 10 I | No adhesion | No adhesion | No adhesion |

The results in Table 21 demonstrate that for monofunctional style inks containing diacetone acrylamide, increasing levels of the difunctional monomer hydroxypivalyl hydroxypivalate diacrylate leads to worsening adhesion when incorporated at levels of between 1-10% depending on the substrate, and total adhesion loss above 10%. When compared directly with the results of Example 8 it is clear that diacetone acrylamide offers a close performance profile to N-vinylcaprolactam and that adhesion loss is associated with the increased shrinkage that comes from the use of the multifunctional monomer hydroxypivalyl hydroxypivalate diacrylate.

Example 11—Properties of Cyan Ink-Jet Inks Containing Diacetone Acrylamide and 1,6-Hexanediol Multifunctional Monomer Cyan inkjet inks were prepared according to the formulations in Table 22.

TABLE 22

|  |  | Examples | | | |
|---|---|---|---|---|---|
| Material | Source/commercial code | Cyan 11 A | Cyan 11 B | Cyan 11 C | Cyan 11 D |
| Diacetone acrylamide | Sigma-Aldrich | 24.9 | 24.9 | 24.9 | 24.9 |
| 1,6-hexanediol diacrylate | Allnex, HDDA | 0 | 1 | 2 | 4 |
| Cyclic trimethylolpropane formal acrylate | Sartomer, SR531 | 18 | 17 | 16 | 14 |
| Isobornyl acrylate | Sartomer, SR506D | 12 | 12 | 12 | 12 |
| 2-Phenoxyethylacrylate | Sartomer, SR339EU | 16.25 | 16.25 | 16.25 | 16.25 |
| Photoinitiator | IGM, Omnirad TPO | 4.9 | 4.9 | 4.9 | 4.9 |
| Photoinitiator | BASF, Irgacure 184 | 2 | 2 | 2 | 2 |
| Photoinitiator | Lambson, DETX | 2 | 2 | 2 | 2 |
| Photoinitiator | BASF, Irgacure 819 | 2.6 | 2.6 | 2.6 | 2.6 |
| Slip additive | Evonik, Tegoglide 410 | 0.5 | 0.5 | 0.5 | 0.5 |

TABLE 22-continued

|  |  | Examples | | | |
|---|---|---|---|---|---|
| Material | Source/commercial code | Cyan 11 A | Cyan 11 B | Cyan 11 C | Cyan 11 D |
| Resin solution (in monomer) | Lucite, Elvacite 2013 | 6 | 6 | 6 | 6 |
| Stabilizer package |  | 1.12 | 1.12 | 1.12 | 1.12 |
| Pigment concentrate |  | 9.73 | 9.73 | 9.73 | 9.73 |
| containing 25% CI Pigment Blue 15:4 in cyclic trimethylolpropane formal acrylate |  |  |  |  |  |
| Total |  | 100 | 100 | 100 | 100 |

Adhesion

The inks in Table 22 were printed onto Dibond, polycarbonate, and acrylic substrates using a 12 micron K bar and cured at a dose of 150 mJ under a medium pressure mercury arc lamp on a Primarc Maxicure UV rig. Their adhesion to the test substrates was then tested with the well-known cross hatch adhesion test (ISO 2409) using a scalpel and ISO 2409 adhesive tape from Elcometer. Results are given in numerical categories according to the amount of ink removed from zero (perfect, no ink removed) to 5 (>35% ink removed). Inks where all the ink is removed and there is no adhesion at all are also recorded. These results are given in Table 23.

TABLE 23

| | Crosshatch adhesion test results | | |
|---|---|---|---|
| Example | Dibond | Polycarbonate | Acrylic |
| Cyan 11 A | No adhesion | 0 | 0 |
| Cyan 11 B | No adhesion | 1 | 0 |
| Cyan 11 C | No adhesion | 4 | 1 |
| Cyan 11 D | No adhesion | No adhesion | 5 |

The results in Table 23 demonstrate that for monofunctional style inks containing diacetone acrylamide, increasing levels of the difunctional monomer 1,6-hexanediol diacrylate leads to worsening adhesion when incorporated at levels of between 1 and 4%. When compared directly with the results of Example 9 it is clear that diacetone acrylamide offers a close performance profile to N-vinylcaprolactam and that adhesion loss is associated with the increased shrinkage that comes from the use of the multifunctional monomer 1,6-hexanediol diacrylate.

Example 12—Properties of Cyan Ink-Jet Inks Containing Diacetone Acrylamide and Trimethylolpropane Triacrylate Multifunctional pCyan inkjet inks were prepared according to the formulations in Table 24.

TABLE 24

|  |  | Examples | | | | | | | | |
|---|---|---|---|---|---|---|---|---|---|---|
| Material | Source/commercial code | Cyan 12 A | Cyan 12 B | Cyan 12 C | Cyan 12 D | Cyan 12 E | Cyan 12 F | Cyan 12 G | Cyan 12 H | Cyan 12 I |
| Diacetone acrylamide | Sigma-Aldrich | 24.9 | 24.9 | 24.9 | 24.9 | 24.9 | 24.9 | 24.9 | 24.9 | 24.9 |
| Trimethylolpropane triacrylate | Sartomer, SR 351 | 0 | 1 | 2 | 4 | 6 | 8 | 10 | 12 | 15 |
| Cyclic trimethylolpropane formal acrylate | Sartomer, SR531 | 18 | 17 | 16 | 14 | 12 | 10 | 8 | 6 | 3 |
| Isobornyl acrylate | Sartomer, SR506D | 12 | 12 | 12 | 12 | 12 | 12 | 12 | 12 | 12 |
| 2-Phenoxyethylacrylate | Sartomer, SR339EU | 16.25 | 16.25 | 16.25 | 16.25 | 16.25 | 16.25 | 16.25 | 16.25 | 16.25 |
| Photoinitiator | IGM, Omnirad TPO | 4.9 | 4.9 | 4.9 | 4.9 | 4.9 | 4.9 | 4.9 | 4.9 | 4.9 |
| Photoinitiator | BASF, Irgacure 184 | 2 | 2 | 2 | 2 | 2 | 2 | 2 | 2 | 2 |
| Photoinitiator | Lambson, DETX | 2 | 2 | 2 | 2 | 2 | 2 | 2 | 2 | 2 |
| Photoinitiator | BASF, Irgacure 819 | 2.6 | 2.6 | 2.6 | 2.6 | 2.6 | 2.6 | 2.6 | 2.6 | 2.6 |
| Slip additive | Evonik, Tegoglide 410 | 0.5 | 0.5 | 0.5 | 0.5 | 0.5 | 0.5 | 0.5 | 0.5 | 0.5 |
| Resin solution (in monomer) | Lucite, Elvacite 2013 | 6 | 6 | 6 | 6 | 6 | 6 | 6 | 6 | 6 |
| Stabilizer package |  | 1.12 | 1.12 | 1.12 | 1.12 | 1.12 | 1.12 | 1.12 | 1.12 | 1.12 |
| Pigment concentrate containing |  | 9.73 | 9.73 | 9.73 | 9.73 | 9.73 | 9.73 | 9.73 | 9.73 | 9.73 |
| 25% CI Pigment Blue 15:4 in cyclic trimethylolpropane formal acrylate |  |  |  |  |  |  |  |  |  |  |
| Total |  | 100 | 100 | 100 | 100 | 100 | 100 | 100 | 100 | 100 |

Adhesion

The inks in Table 24 were printed onto Dibond, polycarbonate, and acrylic substrates using a 12 micron K bar and cured at a dose of 150 mJ under a medium pressure mercury arc lamp on a Primarc Maxicure UV rig. Their adhesion to the test substrates was then tested with the well-known cross hatch adhesion test (ISO 2409) using a scalpel and ISO 2409 adhesive tape from Elcometer. Results are given in numerical categories according to the amount of ink removed from zero (perfect, no ink removed) to 5 (>35% ink removed). Inks where all the ink is removed and there is no adhesion at all are also recorded. These results are given in Table 25.

TABLE 25

| | Crosshatch adhesion test results | | |
|---|---|---|---|
| Example | Dibond | Polycarbonate | Acrylic |
| Cyan 12 A | 3 | 0 | 0 |
| Cyan 12 B | 3 | 1 | 0 |
| Cyan 12 C | 3 | 4 | 0 |
| Cyan 12 D | 3 | 4 | 4 |
| Cyan 12 E | No adhesion | No adhesion | No adhesion |
| Cyan 12 F | No adhesion | No adhesion | No adhesion |
| Cyan 12 G | No adhesion | No adhesion | No adhesion |
| Cyan 12 H | No adhesion | No adhesion | No adhesion |
| Cyan 12 I | No adhesion | No adhesion | No adhesion |

The results in Table 25 demonstrate that for monofunctional style inks containing diacetone acrylamide, increasing levels of the multifunctional monomer trimethylolpropane triacrylate leads to worsening adhesion when incorporated at levels of between 1-4% depending on the substrate, and total adhesion loss above 4%. When compared with the results of Examples 8-11 it is clear that diacetone acrylamide offers a close performance profile to N-vinylcaprolactam and that adhesion loss is associated with the increased shrinkage that comes from the use of the multifunctional monomer trimethylolpropane triacrylate.

Example 13—Preparation of 2-(prop-2-enamido)ethyl acetate

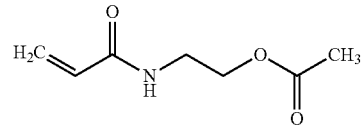

30.0 g of N-hydroxy ethyl acrylamide (0.2606 moles), 26.32 g of triethylamine (0.2606 moles) and 50 ml of dichloromethane were mixed in a two necked round bottomed flask equipped with a stirrer, condenser and nitrogen inlet and outlet. The temperature was reduced to <5° C. using an ice/water bath. The mixture was stirred and 20.46 g of acetyl chloride (0.2606 moles) in 20 ml of dichloromethane was added drop wise ensuring the exotherm was controlled throughout (<10° C.). Addition was carried out in approximately 2 hours. The mixture was stirred throughout and under a constant flow of nitrogen gas. The mixture was then allowed to warm to room temperature. The mixture was extracted with 2×100 ml of 0.1 M hydrochloric acid, 2×100 ml of 0.1 M sodium hydroxide and 2×100 ml of deionised water. The organics were then dried with anhydrous magnesium sulphate. The magnesium sulphate was removed by filtration and the solvent removed on a rotary evaporator to yield the product.

Product yield 4.8 g (11.72%).

The product was analysed by IR.

IR: carbonyl C=O at 1740 cm$^{-1}$ due to an ester.

Example 14—Properties of Cyan Ink-Jet Inks Containing 2-(Prop-2-Enamido)Ethyl Acetate Cyan inkjet inks were prepared according to the formulations in Table 26. Ink viscosity was recorded using a Brookfield DVII viscometer at 50° C.

TABLE 26

| | | Examples | | | | | |
|---|---|---|---|---|---|---|---|
| Material | Source/commercial code | Cyan A (comp) | Cyan B (comp) | Cyan C (inv) | Cyan D (inv) | Cyan E (inv) | Cyan F (inv) |
| N-vinyl caprolactam | BASF, V-CAP | 24.9 | 0 | 0 | 0 | 0 | 0 |
| Example 13 | | 0 | 0 | 5 | 10 | 20 | 30 |
| Cyclic trimethylolpropane formal acrylate | Sartomer, SR531 | 23.13 | 35.575 | 33.075 | 30.575 | 25.575 | 20.575 |
| 2-Phenoxyethylacrylate | Sartomer, SR339EU | 23.12 | 35.575 | 33.075 | 30.575 | 25.575 | 20.575 |
| Photoinitiator | IGM, Omnirad TPO | 4.9 | 4.9 | 4.9 | 4.9 | 4.9 | 4.9 |
| Photoinitiator | BASF, Irgacure 184 | 2 | 2 | 2 | 2 | 2 | 2 |
| Photoinitiator | Lambson, DETX | 2 | 2 | 2 | 2 | 2 | 2 |
| Photoinitiator | BASF, Irgacure 819 | 2.6 | 2.6 | 2.6 | 2.6 | 2.6 | 2.6 |
| Slip additive | Evonik, Tegoglide 410 | 0.5 | 0.5 | 0.5 | 0.5 | 0.5 | 0.5 |
| Resin solution (in monomer) | Lucite, Elvacite 2013 | 6 | 6 | 6 | 6 | 6 | 6 |
| Stabilizer package | | 1.12 | 1.12 | 1.12 | 1.12 | 1.12 | 1.12 |
| Pigment concentrate containing 25% CI Pigment Blue 15:4 in cyclic trimethylolpropane formal | | 9.73 | 9.73 | 9.73 | 9.73 | 9.73 | 9.73 |
| Total | | | | | | | |
| Viscosity (mPas @ 50° C.) | | 9.45 | 10.4 | 12.80 | 13.60 | 16.10 | 18.60 |

Note:
"comp" = Comparative Example;
"inv" = Inventive Example

Cure Speed/Blocking Resistance

The inks in Table 26 were printed onto PE85 white Top Trans label substrate (from Avery Dennison) using a number 2 K bar and cured at a dose of 56 mJ under a medium pressure mercury arc lamp on a Primarc Maxicure UV rig. The prints were then stacked with a piece of blank Incada Excel carton board substrate (reverse side) on top and put under a pressure of 10 tons for 5 seconds in a Specac blocking tester. The cartonboard layer was removed and the level of ink blocking determined by amount of color transferred to the blank substrate using a Spectraflash 600 Spectrophotometer measuring the DL* value through a wide aperture. Lower levels of DL* indicate faster cure speed and better blocking performance due to lower ink transfer. Results are given in Table 27.

TABLE 27

| Example | DL* 56 mJ |
| --- | --- |
| Cyan A | 0.70 |
| Cyan B | 3.17 |
| Cyan C | 3.25 |
| Cyan D | 2.76 |
| Cyan E | 2.18 |
| Cyan F | 1.51 |

The results in Table 27 demonstrate that the inventive inks show improved cure/blocking resistance as the level of the acrylamide Example 13 is increased and demonstrates good utility.

Example 15—Properties of Black Water-Based UV Inks Containing Acrylamide Monomers Black water-based UV inkjet inks were prepared according to the formulations in Table 28. Ink viscosity was recorded using a Brookfield DVII viscometer at 32° C.

TABLE 28

| | | Examples | | | | | | | |
| --- | --- | --- | --- | --- | --- | --- | --- | --- | --- |
| Material | Source/commercial code | A (comp) | B (inv) | C (inv) | D (inv) | E (inv) | F (inv) | G (inv) | H (inv) |
| UV crosslinkable aqueous polyurethane dispersion | NEORAD R-444, ex DSM | 20 | 20 | 20 | 20 | 20 | 20 | 20 | 20 |
| Deionised water | | 51 | 46 | 50 | 46 | 46 | 46 | 46 | 46 |
| Solvent | Brenntag UK, Mono propylene glycol | 15 | 15 | 15 | 15 | 15 | 15 | 15 | 15 |
| Photoinitiator | Irgacure 2959, BASF | 1.0 | 1.0 | 1.0 | 1.0 | 1.0 | 1.0 | 1.0 | 1.0 |
| Amine synergist | IMHOFF & STAHL GMBH, Triethanolamine | 0.1 | 0.1 | 0.1 | 0.1 | 0.1 | 0.1 | 0.1 | 0.1 |
| Diacetone acrylamide | DSM Fine Chemicals | | 5 | | | | | | |
| N,N-Methylene bisacrylamide | MBA, MRC Unitec | | | 1* | | | | | |
| N-isobutoxy methyl acrylamide | IBMA, MRC Unitec | | | | 5 | | | | |
| N-acryloyl morpholine | ACMO, RAHN | | | | | 5 | | | |
| N-hydroxy ethyl acrylamide | Sigma-Aldrich | | | | | | 5 | | |
| N,N'-diethyl acrylamide | Sigma-Aldrich | | | | | | | 5 | |
| N-isopropyl acrylamide | Sigma-Aldrich | | | | | | | | 5 |
| Black pigment dispersion | SunChemical proprietary | 12.5 | 12.5 | 12.5 | 12.5 | 12.5 | 12.5 | 12.5 | 12.5 |
| Biocide | CHEMLINK SPECIALITIES, Nipacide B1 | 0.1 | 0.1 | 0.1 | 0.1 | 0.1 | 0.1 | 0.1 | 0.1 |
| Surfactant | Alpha Chemicals, Capstone FS-3100 | 0.3 | 0.3 | 0.3 | 0.3 | 0.3 | 0.3 | 0.3 | 0.3 |
| Total | | 100 | 100 | 100 | 100 | 100 | 100 | 100 | 100 |
| Viscosity (mPas @ 32° C.) | | 2.37 | 2.88 | 2.43 | 2.88 | 2.67 | 2.73 | 2.88 | 2.91 |

Note:
"comp" = Comparative Example;
"inv" = Inventive Example
*N,N-Methylene bisacrylamide not sufficiently soluble to be tested at 5%

Cure Speed/Resistance

The inks in Table 28 were printed onto coated Lenetta charts (from Cornelius) using a 10 micron K bar from RK and dried using a hot air blower for 15 seconds to remove all the solvent and giving a dry, tack-free film. This ink film was then cured at a dose of 150 mJ using a 300 W/inch medium pressure mercury arc lamp fitted to a Primarc Maxicure UV curing rig. The resistance of the cured ink was then assessed by a solvent rub test using a Satra STM421 rub tester with the pad soaked in deionised water. The test involves the rub tester moving the sample stage back and forth, and the number of rubs recorded when the sample is showing multiple defects across the entire sample. Results are shown in Table 29 as an average of 2 runs.

TABLE 29

| Example | Water rub resistance at 150 mJ |
| --- | --- |
| Comp. A | 47 |
| Inv. B | >200 |
| Inv. C | 147 |
| Inv. D | 141 |
| Inv. E | 53 |
| Inv. F | 90 |

TABLE 29-continued

| Example | Water rub resistance at 150 mJ |
|---|---|
| Inv. G | 102 |
| Inv. H | 113 |

The results in Table 29 demonstrate that the inventive inks show various degrees of improved cure/resistance as a result of incorporation of acrylamide monomer. The preferred diacetone acrylamide (Inv. B) exhibits better cure/resistance properties than the other acrylamides tested, including the well-known and widely used tertiary acrylamide ACMO. The invention therefore shows excellent utility in aqueous UV curing Inkjet inks.

Example 16—Properties of Yellow, Magenta, and Cyan Water-Based UV Inks Containing Acrylamide Monomers Yellow, magenta, and cyan water-based UV inkjet inks were prepared according to the formulations in Table 30 using each of 2 different acrylamides:
Diacetone acrylamide (Sigma-Aldrich)
N-isobutoxymethyl acrylamide (MRC Unitec)

TABLE 31

| Example | Water rub resistance at 41 mJ | Water rub resistance at 31 mJ |
|---|---|---|
| Comp. A | >200 | >200 |
| Inv. B | >200 | >200 |
| Inv. C | >200 | >200 |
| Comp. D | 79 | — |
| Inv. E | >200 | — |
| Inv. F | >200 | — |
| Comp. G | 44 | — |
| Inv. H | 26 | — |
| Inv. I | >200 | — |

The results in Table 31 demonstrate that the inventive inks show various degrees of improved cure/resistance as a result of incorporation of acrylamide monomer. The preferred diacetone acrylamide (Inv. B, E & H) exhibits excellent utility in magenta inks, but shows no significant change in cyan inks. N-isobutyl methyl acrylamide (Inv. C, F & I) on the other hand shows excellent utility in yellow and cyan inks. The resistance of standard yellow inks and those containing acrylamide monomer all demonstrate cure speeds sufficient to give >200 rubs at even the lowest dose capable of being tested and thus good utility is implied.

TABLE 30

| | | Examples | | | | | | | | |
|---|---|---|---|---|---|---|---|---|---|---|
| Material | Source/commercial code | A (comp) | B (inv) | C (inv) | D (comp) | E (inv) | F (inv) | G (comp) | H (inv) | I (inv) |
| UV crosslinkable aqueous polyurethane dispersion | NEORAD R-444, ex DSM | 20 | 20 | 20 | 20 | 20 | 20 | 20 | 20 | 20 |
| Deionised water | | 51 | 46 | 46 | 51 | 46 | 46 | 51 | 46 | 46 |
| Solvent | Brenntag UK, Mono propylene glycol | 15 | 15 | 15 | 15 | 15 | 15 | 15 | 15 | 15 |
| Photoinitiator | Irgacure 2959, BASF | 1.0 | 1.0 | 1.0 | 1.0 | 1.0 | 1.0 | 1.0 | 1.0 | 1.0 |
| Amine synergist | IMHOFF & STAHL GMBH, Triethanolamine | 0.1 | 0.1 | 0.1 | 0.1 | 0.1 | 0.1 | 0.1 | 0.1 | 0.1 |
| Diacetone acrylamide | DSM Fine Chemicals | | 5 | | | 5 | | | 5 | |
| N-isobutoxy methyl acrylamide | IBMA, MRC Unitec | | | 5 | | | 5 | | | 5 |
| Yellow pigment dispersion | SunChemical proprietary | 12.5 | 12.5 | 12.5 | | | | | | |
| Magenta pigment dispersion | SunChemical proprietary | | | | 12.5 | 12.5 | 12.5 | | | |
| Cyan pigment dispersion | SunChemical proprietary | | | | | | | 12.5 | 12.5 | 12.5 |
| Biocide | CHEMLINK SPECIALITIES, Nipacide B1 | 0.1 | 0.1 | 0.1 | 0.1 | 0.1 | 0.1 | 0.1 | 0.1 | 0.1 |
| Surfactant | Alpha Chemicals, Capstone FS-3100 | 0.3 | 0.3 | 0.3 | 0.3 | 0.3 | 0.3 | 0.3 | 0.3 | 0.3 |
| Total | | 100 | 100 | 100 | 100 | 100 | 100 | 100 | 100 | 100 |

Note:
"comp" = Comparative Example;
"inv" = Inventive Example

Cure Speed/Resistance

The inks in Table 30 were printed onto coated Lenetta charts (from Cornelius) using a 10 micron K bar from RK and dried using a hot air blower for 15 seconds to remove all the solvent and giving a dry, tack-free film. This ink film was then cured at a dose of either 31 or 41 mJ using a 300 W/inch medium pressure mercury arc lamp fitted to a Primarc Maxicure UV curing rig. The resistance of the cured ink was then assessed by a solvent rub test using a Satra STM421 rub tester with the pad soaked in deionised water. The test involves the rub tester moving the sample stage back and forth, and the number of rubs recorded when the sample is showing multiple defects across the entire sample. Results are shown in Table 31 as an average of 2 runs.

Example 17—Preparation of 4-Carboxymethoxy Benzophenone

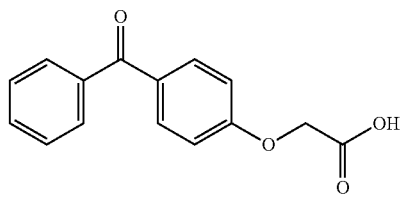 [SMILES: O=C(O)COc1ccc(C(=O)c2ccccc2)cc1]

79.2 g (0.4 moles) of 4-hydroxy benzophenone, 82.9 g potassium carbonate (0.6 moles) and 400 mL of methyl ethyl ketone were mixed in a 2 L flask equipped with a stirrer, temperature probe and condenser. The mixture was heated to reflux for 1 hour. After cooling to room temperature, 73.5 g (0.6 moles) ethyl chloroacetate was added and the mixture heated to reflux for a total of 10.25 hours before cooling and adding 400 mL of water. The methyl ethyl ketone was distilled off and cooled to 60° C. before adding a solution of 32.5 g sodium hydroxide in 800 mL of water. The solution was heated again to reflux for 3 hours before cooling to 95° C. and adding 120 mL of concentrated hydrochloric acid over 10-20 minutes, keeping the reaction temperature at 95° C.+/−2° C. The solution was refluxed for 5 minutes before cooling and leaving to stand overnight. The solution was filtered and washed with 500 mL deionised water before drying in a vacuum oven to obtain the final product.

Yield 101.09 g (98.7% %).

Example 18—Properties of Cyan Water-Based UV Inks Containing Acrylamide Monomers Cyan water-based UV inkjet inks were prepared according to the formulations in Table 32 using diacetone acrylamide and each of 3 different photoinitators:
- Polyethylene glycol mono-4-(2-hydroxy-2-methyl propiophenone) ether (PC3221, Inspec UK, Southampton)
- 4-hydroxy benzophenone (Sigma Aldrich)
- 4-carboxymethoxy benzophenone (Example 17)

sample is showing multiple defects across the entire sample. Results are shown in Table 33 as an average of 2 runs.

TABLE 33

| Example | Water rub resistance at 113 mJ | Water rub resistance at 42 mJ |
| --- | --- | --- |
| Comp. A | — | 38 |
| Inv. B | — | >200 |
| Comp. C | 8 | — |
| Inv. D | >200 | — |
| Comp. E | 63 | — |
| Inv. F | >200 | — |

The results in Table 33 demonstrate that the inventive inks show various degrees of improved cure/resistance as a result of incorporation of acrylamide monomer independently of the type of photoinitiator being used for curing. The preferred diacetone acrylamide demonstrates excellent utility in cyan inks with any of the 3 photoinitiator types evaluated, giving a significant improvement to the cure/resistance properties.

Example 19—Properties of Black Water-Based UV Inks Containing Acrylamide Monomers Black water-based UV inkjet inks were prepared according to the formulations in Table 34, using diacetone acrylamide or N,N-methylene bisacrylamide.

TABLE 32

| | | Examples | | | | | |
| --- | --- | --- | --- | --- | --- | --- | --- |
| Material | Source/commercial code | A (comp) | B (inv) | C (comp) | D (inv) | E (comp) | F (inv) |
| UV crosslinkable aqueous polyurethane dispersion | NEORAD R-444, ex DSM | 20 | 20 | 20 | 20 | 20 | 20 |
| Deionised water | | 51 | 46 | 51 | 46 | 51 | 46 |
| Solvent | Brenntag UK, Mono propylene glycol | 15 | 15 | 15 | 15 | 15 | 15 |
| PC3221 | Inspec | 1.0 | 1.0 | | | | |
| 4-hydroxy benzophenone | Sigma-Aldrich | | | 0.5 | 0.5 | | |
| Example 17 | | | | | | 0.5 | 0.5 |
| Amine synergist | IMHOFF & STAHL GMBH, Triethanolamine | 0.1 | 0.1 | 1.0 | 1.0 | 1.0 | 1.0 |
| Diacetone acrylamide | DSM Fine Chemicals | | 5 | | 5 | | 5 |
| Cyan pigment dispersion | SunChemical proprietary | | | | | 12.5 | 12.5 |
| Biocide | CHEMLINK SPECIALITIES, Nipacide B1 | 0.1 | 0.1 | 0.1 | 0.1 | 0.1 | 0.1 |
| Surfactant | Alpha Chemicals, Capstone FS-3100 | 0.3 | 0.3 | 0.3 | 0.3 | 0.3 | 0.3 |
| Total | | 100 | 100 | 100 | 100 | 100 | 100 |

Note:
"comp" = Comparative Example;
"inv" = Inventive Example

Cure Speed/Resistance

The inks in Table 32 were printed onto coated Lenetta charts (from Cornelius) using a 10 micron K bar from RK and dried using a hot air blower for 15 seconds to remove all the solvent and giving a dry, tack-free film. This ink film was then cured at a dose of either 42 or 113 mJ using a 300 W/inch medium pressure mercury arc lamp fitted to a Primarc Maxicure UV curing rig. The resistance of the cured ink was then assessed by a solvent rub test using a Satra STM421 rub tester with the pad soaked in deionised water. The test involves the rub tester moving the sample stage back and forth, and the number of rubs recorded when the

TABLE 34

| | | Examples | | |
| --- | --- | --- | --- | --- |
| Material | Source/commercial code | A (comp) | B (inv) | C (inv) |
| UV crosslinkable aqueous polyurethane dispersion | NEORAD R-448, ex DSM | 50 | 45 | 45 |
| Deionised water | | 23.5 | 26.5 | 26.5 |
| Photoinitiator | Irgacure 2959, BASF | 1.0 | 1.0 | 1.0 |

TABLE 34-continued

| Material | Source/commercial code | Examples |||
| --- | --- | --- | --- | --- |
| | | A (comp) | B (inv) | C (inv) |
| Amine synergist | Amietol M12 ex Taminco, | 0.4 | 0.4 | 0.4 |
| Diacetone acrylamide | DSM Fine Chemicals | | 2.0 | |
| N,N-Methylene bisacrylamide | MBA, MRC Unitec | | | 2.0 |
| Black pigment dispersion | Cabojet 250C, CABOT | 25 | 25 | 25 |
| Biocide | CHEMLINK SPECIALITIES, Nipacide B1 | 0.1 | 0.1 | 0.1 |
| Total | | 100 | 100 | 100 |

Note:
"comp" = Comparative Example;
"inv" = Inventive Example

Cure Speed/Resistance

The inks in Table 34 were printed onto coated Melinex 752 polyester substrate from DuPont using an 8 micron K bar from RK and dried using a hot air blower for 10 seconds to remove all the solvent and giving a dry, tack-free film. This ink film was then cured at a dose of 200 mJ using a Fusion UV curing rig fitted with an "H" bulb.

The resistance of the cured ink was then assessed by a series of tests:
  Solvent resistance, measured as number of double rubs of a cotton bud soaked in methyl ethyl ketone to penetrate the ink through to the substrate
  Scratch resistance, a qualitative assessment based on the ability of the cured ink to resist scratching by finger nail and given a rating between 1 (poor) to 10 (no defect)
  Face-to-face block resistance, where a 45 cm$^2$ area of ink film was blocked to itself under a pressure of 5 kg for 1 minute. The degree of tack between the blocked ink layers was determined as 1 (the ink films block/stick to each other) to 10 (no tack observed between the two layers.
  Face-to-back block resistance, where a 45 cm$^2$ area of ink film was blocked to a blank piece of Melinex 752 substrate under a pressure of 5 kg for one minute. The degree of tack between the blocked ink layer and the blank substrate was determined as 1 (the ink film blocks/sticks to the blank substrate) to 10 (no tack observed between the two layers).

TABLE 35

| Example | MEK Solvent resistance at 200 mJ | Scratch resistance at 200 mJ | Face-to-face block resistance | Face-to-back block resistance |
| --- | --- | --- | --- | --- |
| Comp. A | 40 | 9 | 8 | 9 |
| Inv. B | >100 | 9 | 9 | 10 |
| Inv. C | >100 | 10 | 10 | 10 |

The results in Table 35 demonstrate that the inventive inks show improved cure/resistance as a result of incorporation of acrylamide monomer and therefore have excellent utility in water-based inkjet inks The present invention has been described in detail, including the preferred embodiments thereof. However, it will be appreciated that those skilled in the art, upon consideration of the present disclosure, may make modifications and/or improvements on this invention that fall within the scope and spirit of the invention.

What is claimed is:

1. A digital printing ink comprising:
   a) 0.5-60 wt % of an acrylamide material or blends thereof;
   b) 0-80 wt % of a monofunctional acrylate monomer or blends thereof;
   c) 0-10 wt % of a difunctional acrylate monomer or blends thereof;
   d) 0-5 wt % of a trifunctional or higher acrylate monomer or blends thereof;
   e) 0.1-25 wt % of a photoinitiator or blends thereof;
   f) 0-18 wt % of an amine synergist;
   g) 0-5 wt % of N-vinyl compounds; and
   h) 0-80 wt % water;
   i) 0-50 wt % of an acrylated polyurethane dispersion; and
   j) 0-30 wt % of a water-compatible organic solvent;
   wherein the composition contains no N-vinyl caprolactam, N-vinyl pyrrolidone, or N-acryloyl morpholine; and
   wherein the acrylamide material is selected from the group consisting of diacetone acrylamide, N-isobutoxymethyl acrylamide, N-isopropyl acrylamide, N,N'-methylene bisacrylamide, or 2-(prop-2-enamido)ethylacetate, or a combination thereof.

2. The ink of claim 1, wherein at least a portion of the acrylamide material is diacetone acrylamide, or wherein the majority of the acrylamide material is diacetone acrylamide, or wherein all of the acrylamide material is diacetone acrylamide.

3. The ink of claim 1, wherein the monofunctional acrylate monomer, or blends thereof, comprises no more than 25 wt % of isobornyl acrylate, t-butyl cyclohexyl acrylate or 3,3,5-trimethyl cyclohexyl acrylate.

4. The ink of claim 1, wherein the monofunctional monomer, or blends thereof, comprises 0.1-20 wt % of isobornyl acrylate, t-butyl cyclohexyl acrylate and 3,3,5-trimethyl cyclohexyl acrylate.

5. The ink of claim 1, wherein the monofunctional monomer, or blends thereof, contains no isobornyl acrylate, t-butyl cyclohexyl acrylate or 3,3,5-trimethyl cyclohexyl acrylate.

6. The ink of claim 1, containing no N-vinyl compounds.

7. The ink of claim 1, containing no difunctional or higher monomers.

8. The ink of claim 1, wherein the photoinitiator is present in an amount of 0.1-20 wt %.

9. The ink of claim 1, wherein the water is present in an amount of 20-70 wt %.

10. The ink of claim 1, wherein the acrylamide material is present in an amount of 1-40 wt %.

11. The ink of claim 1, further comprising a colorant.

12. The ink of claim 1, further comprising one or more additives selected from the group consisting of stabilizers, surfactants, defoamers, slip additives, wetting additives and synergists.

13. An ink according to claim 1, wherein the ink is an ink jet ink.

14. An ink according to claim 1, wherein the ink is an aerosol jet ink.

15. Use of the digital ink of claim 1, comprising printing the ink onto a substrate.

16. A printed article comprising the digital ink of claim 1.

17. The digital printing ink of claim 1, wherein the ink is water-based, and comprises 0.5-60 wt % of an acrylamide material or blends thereof, 15-50 wt % of an acrylated polyurethane dispersion, and 1-80 wt % water.

18. The ink of claim 17, wherein the acrylated polyurethane dispersion is present in an amount of 20-30 wt %.

19. The ink of claim 17, wherein the water is present in an amount of 20-80 wt %.

20. The ink of claim 17, wherein the solvent is present in an amount of 1-30 wt %.

21. The ink of claim 17, wherein the acrylamide material is present in an amount of 0.5-40 wt %.

22. The digital printing ink of claim 1, further comprising a pigment selected from carbon black, zinc oxide, titanium dioxide, phthalocyanine, anthraquinones, perylenes, carbazoles, monoazobenzimidazoles, disazo, rhodamines, indigoids, quinacridones, diazopyranthrones, dinitroanilines, pyrazoles, diazopyranthrones, pyrazoles, dianisidines, pyranthrones, tetracholoroisoindolines, dioxazines, monoazoacrylides and anthrapyrimidines, blue pigments PB1, PB15, PB15:1, PB15:2, PB15:3, PB15:4, PB15:6, PB16, PB60; brown pigments PB5, PB23, and PB265; green pigments PG1, PG7, PG10 and PG36; yellow pigments PY3, PY14, PY16, PY17, PY24, PY65, PY73, PY74 PY83, PY95, PY97, PY108, PY109, PY110, PY113, PY128, PY129, PY138, PY139, PY150, PY151, PY154, PY156, PY175, PY180 and PY213; orange pigments PO5, PO15, PO16, PO31, PO34, PO36, PO43, PO48, PO51, PO60, PO61 and PO71; red pigments PR4, PR5, PR7, PR9, PR22, PR23, PR48, PR48:2, PR49, PR112, PR122, PR123, PR149, PR166, PR168, PR170, PR177, PR179, PR190, PR202, PR206, PR207, PR224 and PR254: violet pigments PV19, PV23, PV32, PV37 and PV42; black pigments PBk1, PBk6, PBk7, PBk8, PBk9, PBk10, PBk11, PBk12, PBk13, PBk14, PBk17, PBk18, PBk19, PBk22, PBk23, PBk24, PBk25, PBk26, PBk27, PBk28, PBk29, PBk30, PBk31, PBk32, PBk33, PBk34, PBk35, NBk1, NBk2, NBk3, NBk4, NBk6; and combinations thereof.

23. A method of making a digital ink, comprising mixing:
- a) 0.5-60 wt % of an acrylamide material or blends thereof;
- b) 0-80 wt % of a monofunctional acrylate monomer or blends thereof;
- c) 0-10 wt % of a difunctional acrylate monomer or blends thereof;
- d) 0-5 wt % of a trifunctional or higher acrylate monomer or blends thereof;
- e) 0.1-25 wt % of a photoinitiator or blends thereof;
- f) 0-18 wt % of an amine synergist;
- g) 0-5 wt % of N-vinyl compounds;
- h) 0-80 wt % water;
- i) 0-50 wt % of an acrylated polyurethane dispersion; and
- j) 0-30 wt % of a water-compatible organic solvent;

wherein the composition contains no N-vinyl caprolactam, N-vinyl pyrrolidone, or N-acryloyl morpholine; and
wherein the acrylamide material is selected from the group consisting of diacetone acrylamide, N-isobutoxymethyl acrylamide, N-isopropyl acrylamide, N,N'-methylene bisacrylamide, or 2-(prop-2-enamido)ethylacetate, or a combination thereof.

* * * * *